US012792809B2

(12) United States Patent
Wu et al.

(10) Patent No.: US 12,792,809 B2
(45) Date of Patent: Nov. 10, 2026

(54) VARIATION-AWARE ANALOG CIRCUIT SIZING WITH CLASSIFIER CHAINS

(71) Applicant: Drexel University, Philadelphia, PA (US)

(72) Inventors: Zhengfeng Wu, Philadelphia, PA (US); Ioannis Savidis, Wallingford, PA (US)

(73) Assignee: Drexel University, Philadelphia, PA (US)

(*) Notice: Subject to any disclaimer, the term of this patent is extended or adjusted under 35 U.S.C. 154(b) by 809 days.

(21) Appl. No.: 18/185,042

(22) Filed: Mar. 16, 2023

(65) Prior Publication Data

US 2023/0297750 A1 Sep. 21, 2023

Related U.S. Application Data

(60) Provisional application No. 63/320,774, filed on Mar. 17, 2022.

(51) Int. Cl.
*G06F 30/367* (2020.01)
*G06F 119/02* (2020.01)

(52) U.S. Cl.
CPC ........ *G06F 30/367* (2020.01); *G06F 2119/02* (2020.01)

(58) Field of Classification Search
CPC .... G06F 30/327; G06F 30/367; G06F 30/392; G06F 30/00; G06F 30/30; G06F 9/30036; G06F 9/30038; G06F 9/3836; G06F 9/30145; G06F 9/505; G06F 9/5088; G06F 2201/82; G06F 2201/85; G06F 2209/501; G06F 21/76; G06F 21/44; G06F 21/73
USPC .................................................. 716/100–106
See application file for complete search history.

(56) References Cited

U.S. PATENT DOCUMENTS

2009/0307638 A1* 12/2009 Mcconaghy ............ G06F 30/36 716/100
2016/0171136 A1* 6/2016 Iskander ................ G06F 30/36 716/106

OTHER PUBLICATIONS

Wu et al. "CALT: Classification with Adaptive Labeling Thresholds for Analog Circuit Sizing", MLCAD, Virtual Event, Nov. 16-20, 2020, 6 pages.
Wu et al. "Variation-aware Analog Circuit Sizing with Classifier Chains ", IEEE, Aug. 2021, 6 pages.

* cited by examiner

*Primary Examiner* — Binh C Tat
(74) *Attorney, Agent, or Firm* — Schott, P.C.

(57) ABSTRACT

A simulation-based optimization framework determines the sizing of components of an analog circuit to meet target design specifications while also satisfying the robustness specifications set by the designer. The robustness is guaranteed by setting a limit on the standard deviations of the variations in the performance parameters of a circuit across all process and temperature corners of interest. Classifier chains are used that, in addition to modeling the relationship between inputs and outputs, learn the relationships among output labels. Additional design knowledge is inferred from the optimal ordering of the classifier chain.

20 Claims, 23 Drawing Sheets

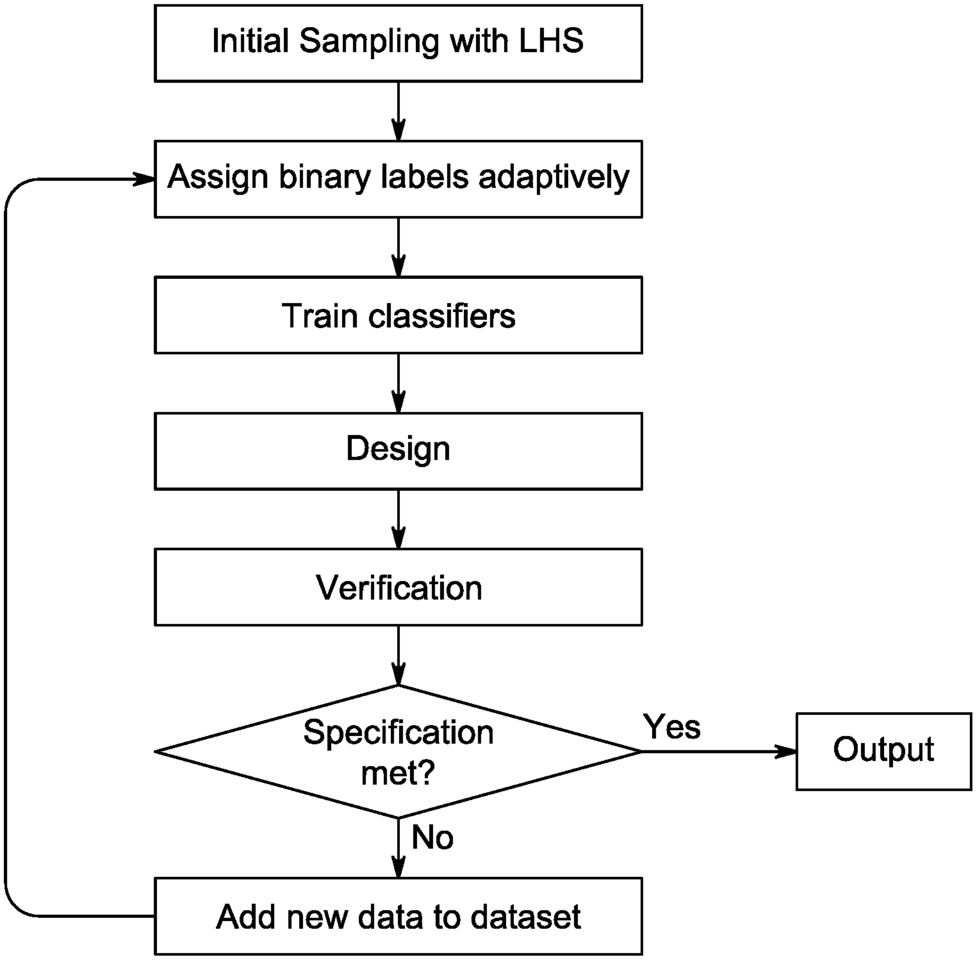
FIG. 1.1

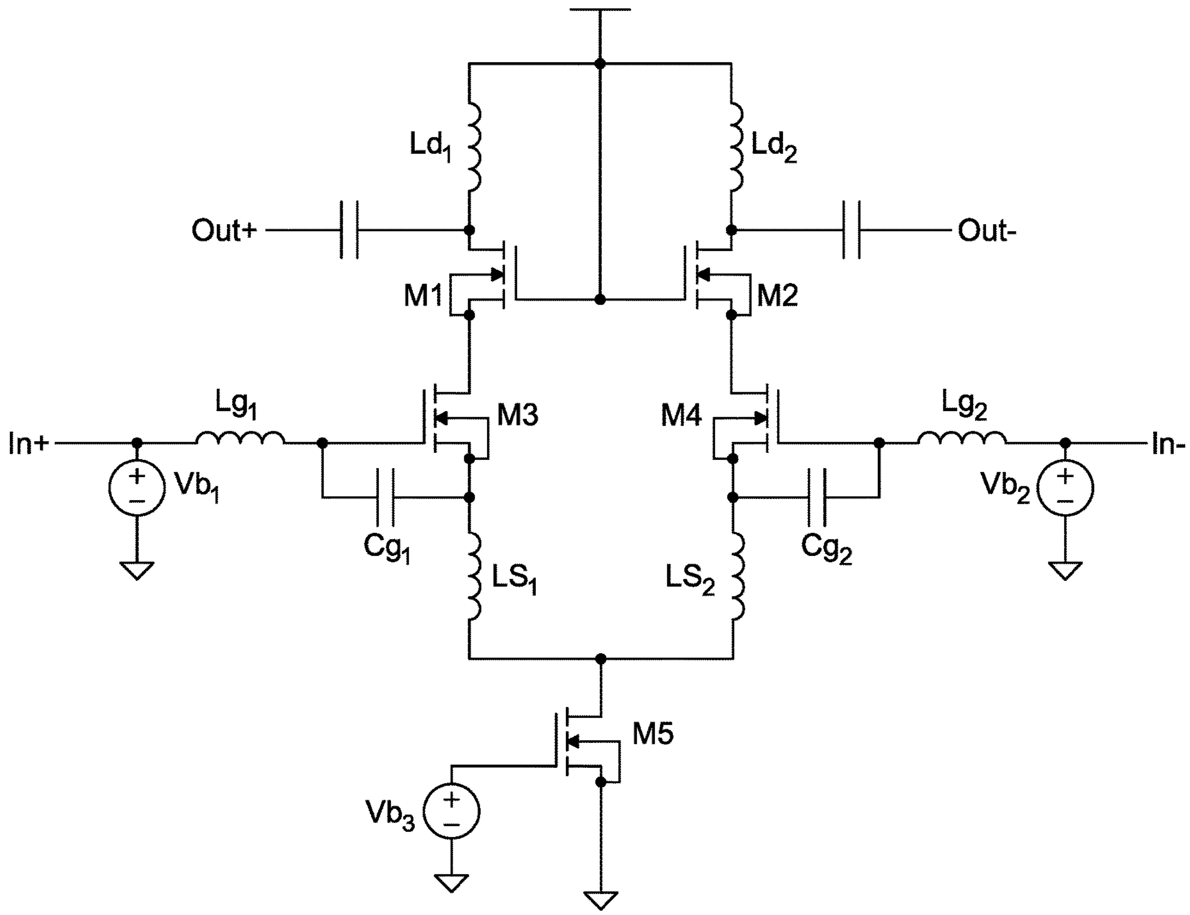
FIG. 1.2

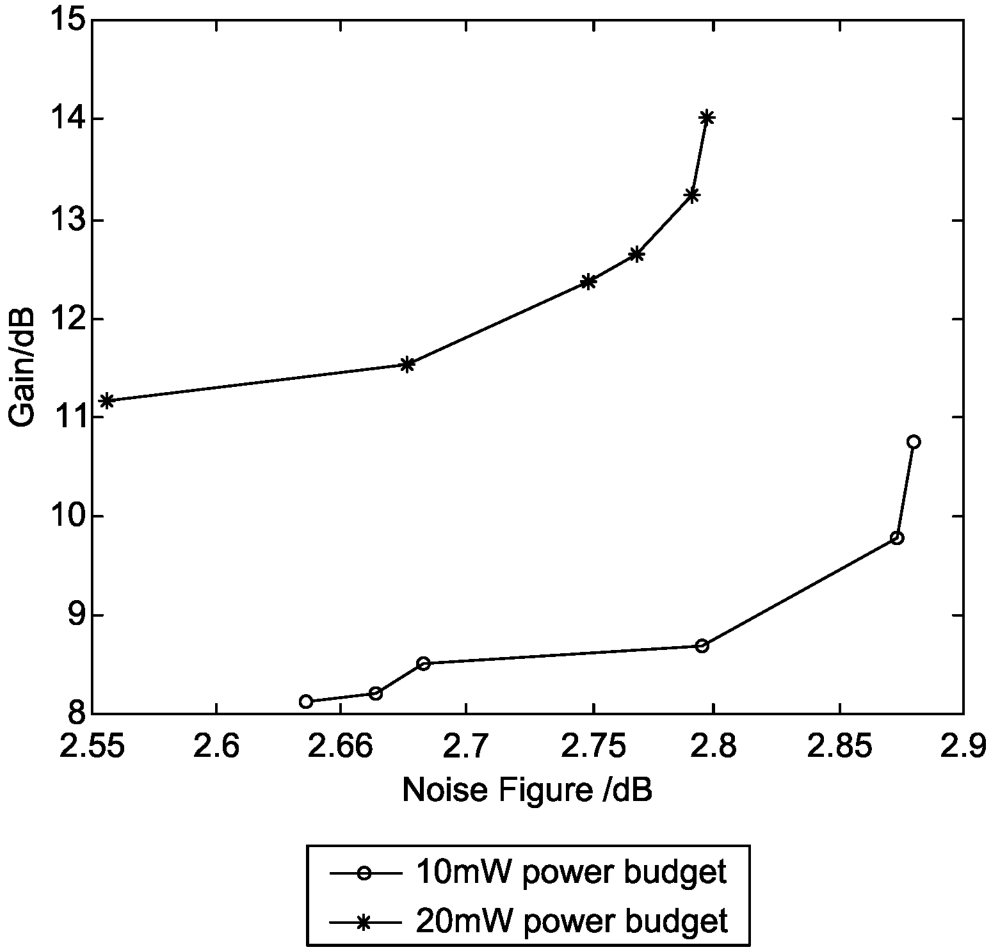
FIG. 1.3

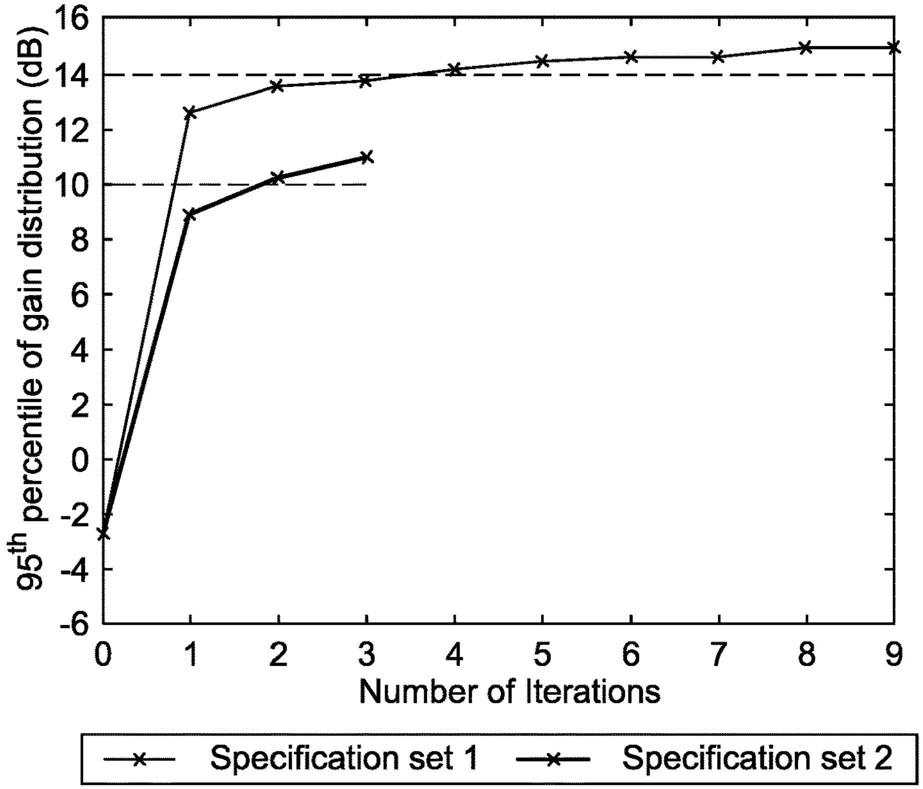
FIG. 1.4 (a)
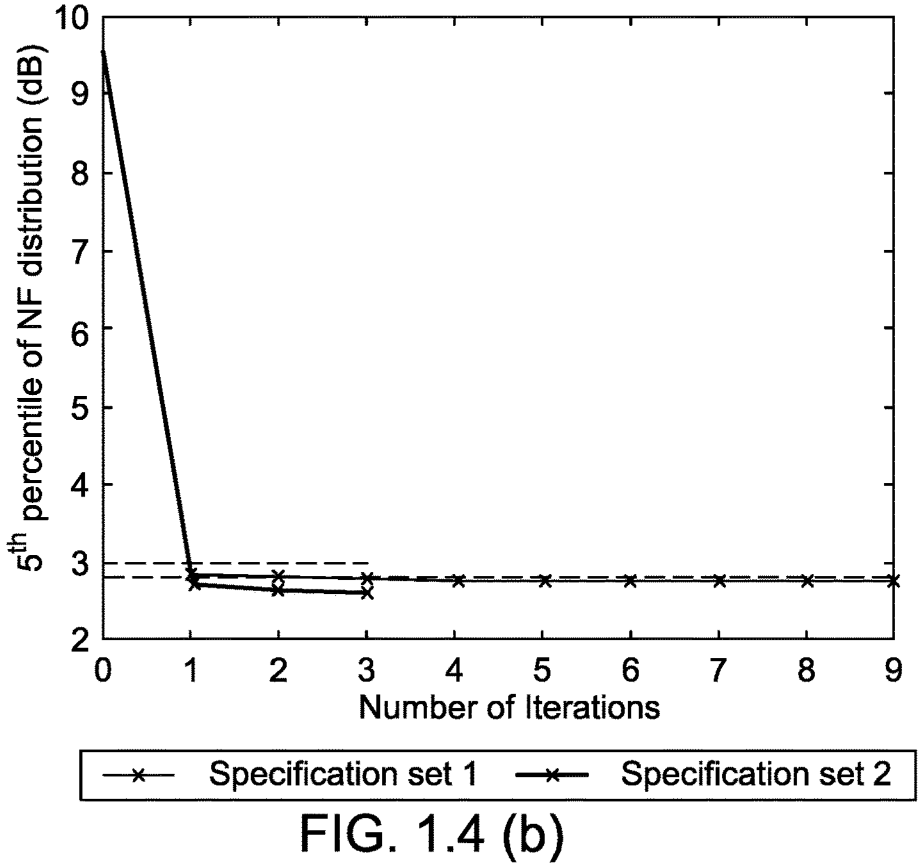
FIG. 1.4 (b)

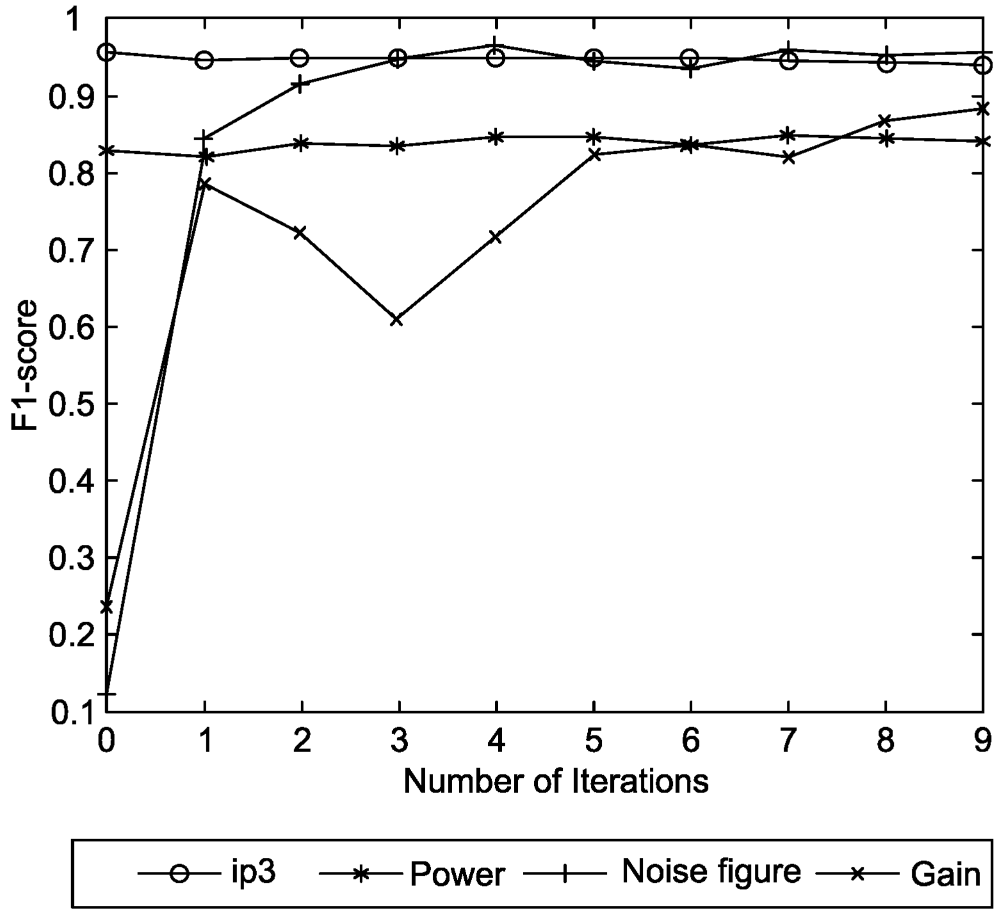
FIG. 1.5

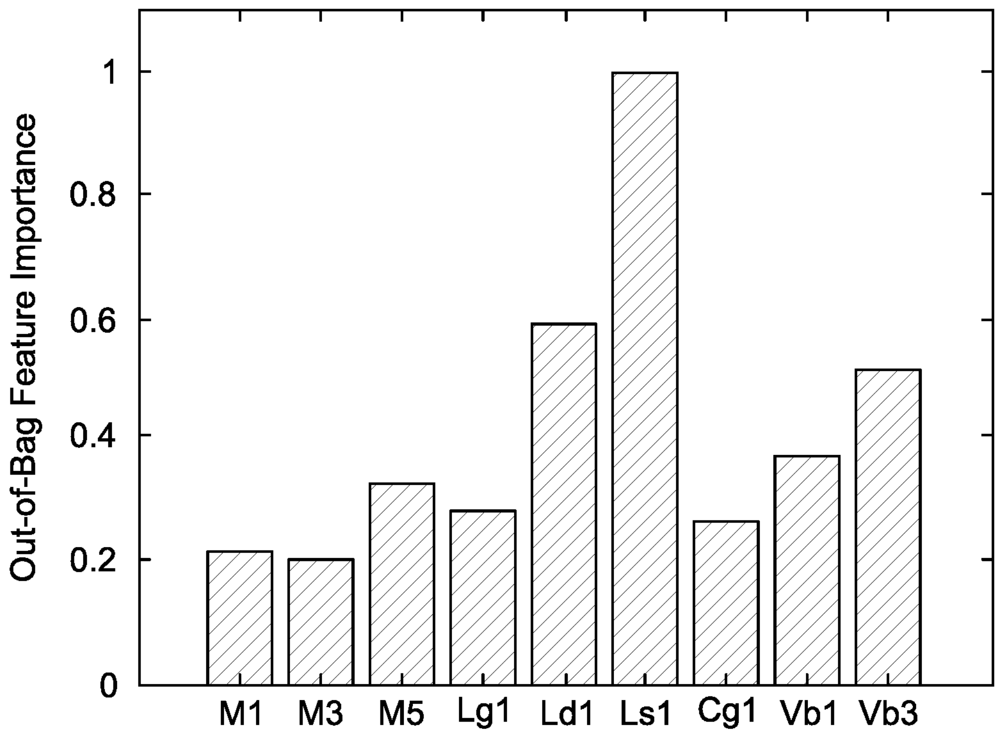
FIG. 1.6 (a)
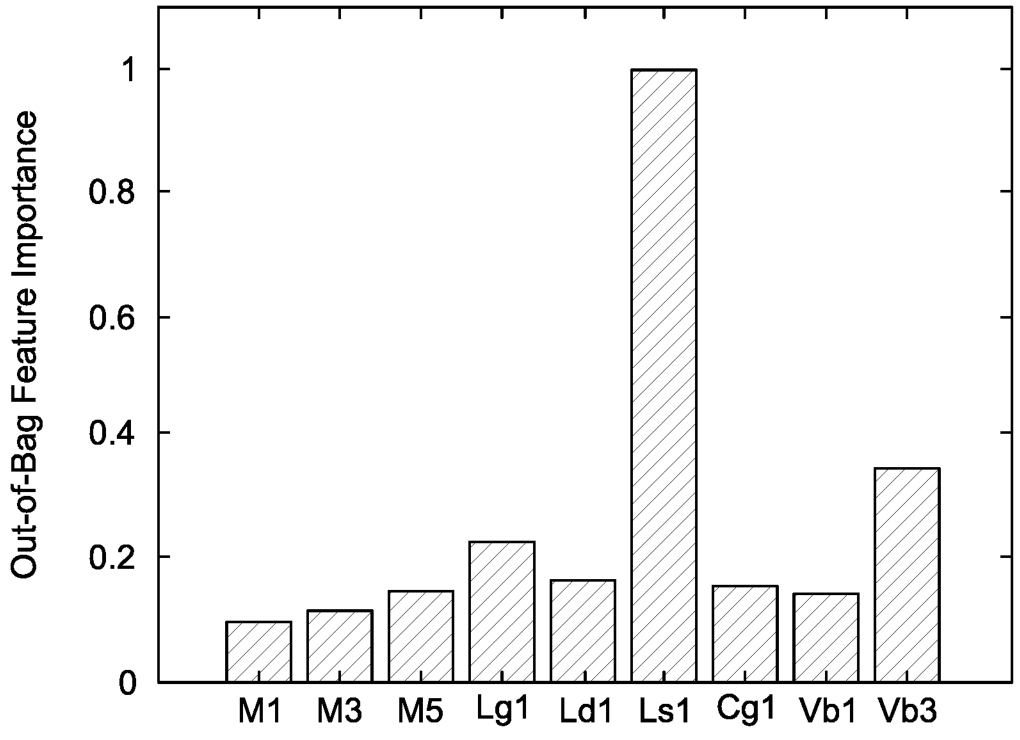
FIG. 1.6 (b)

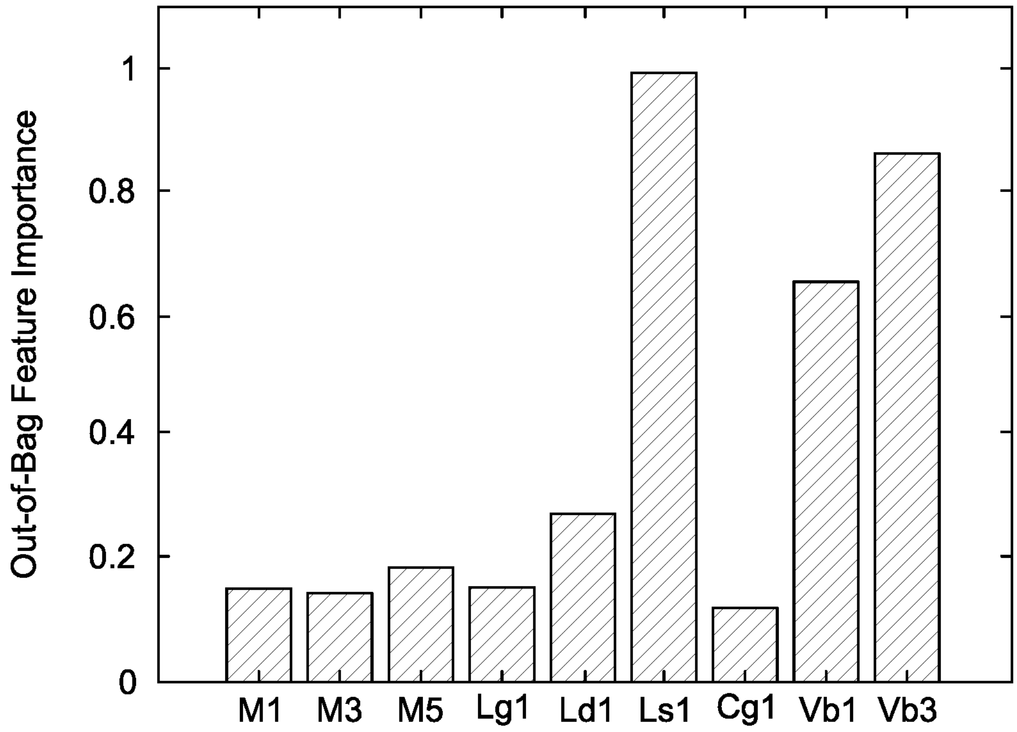
FIG. 1.6 (c)
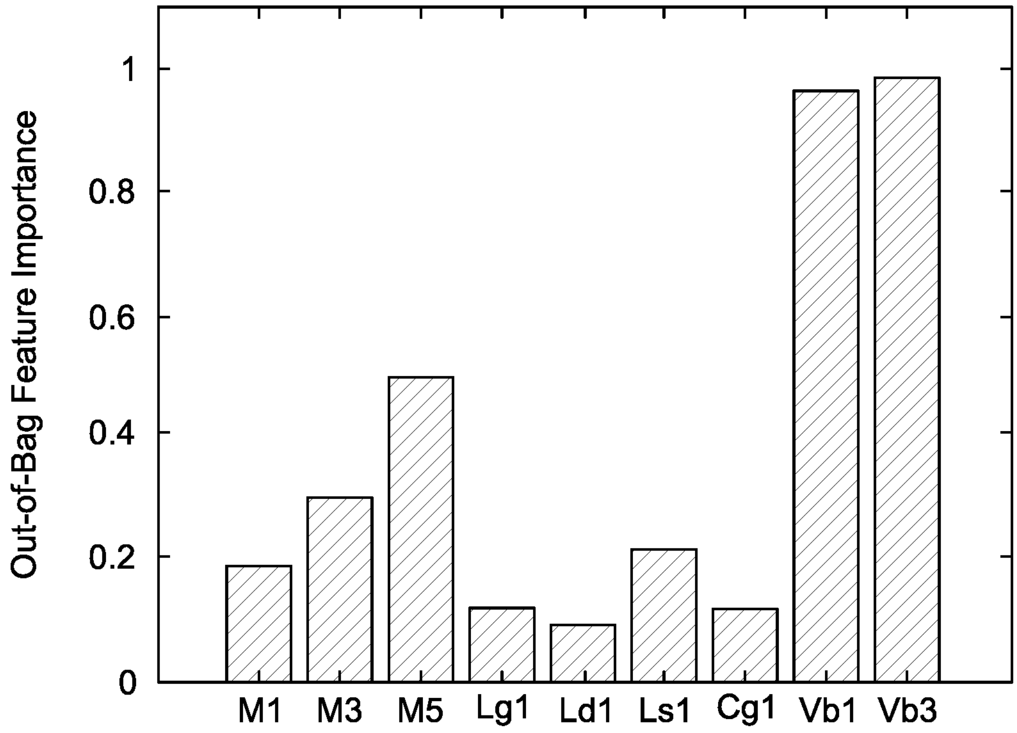
FIG. 1.6 (d)

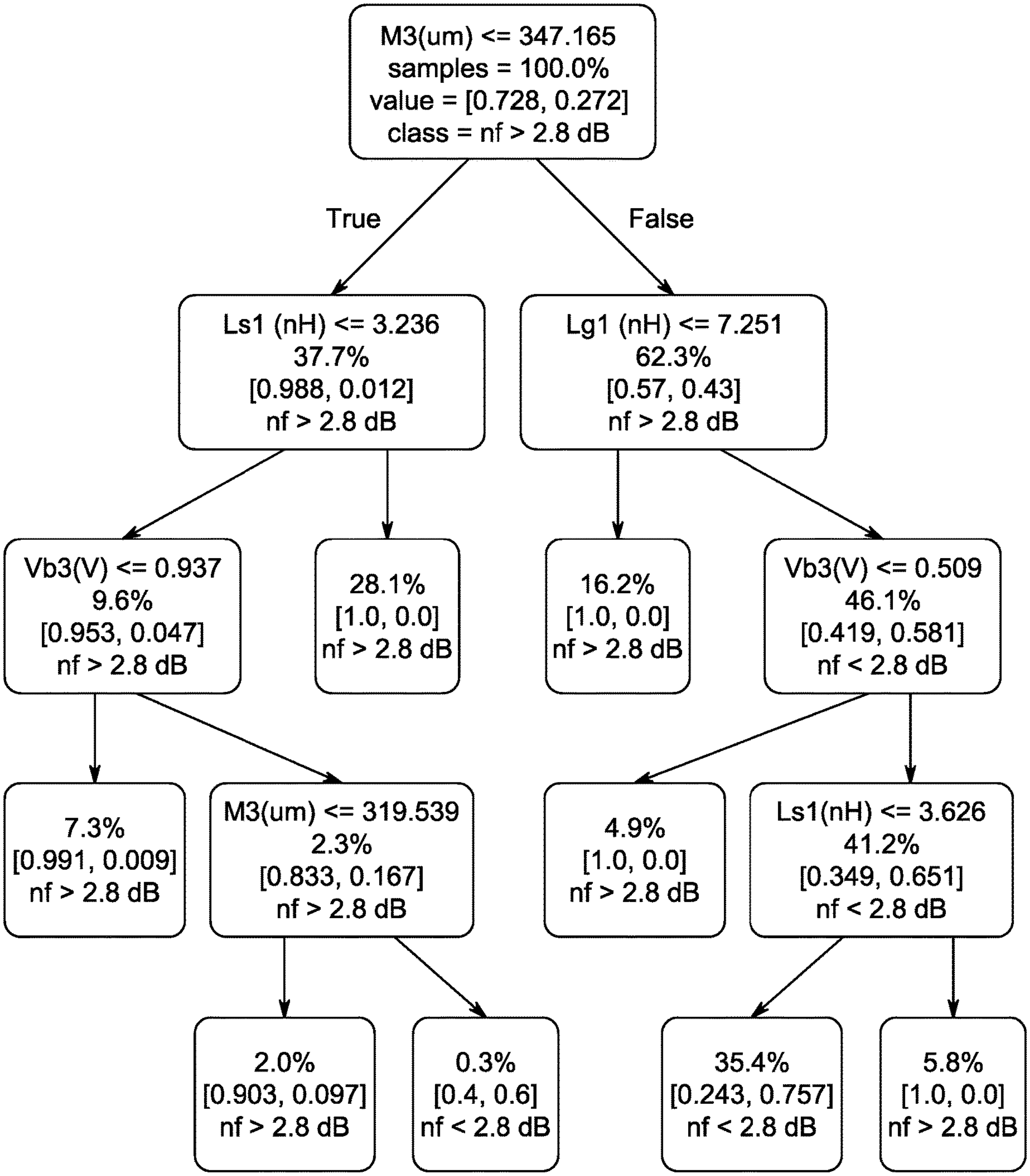
FIG. 1.7

Algorithm 1.1

Algorithm 1: Adaptively Set the Labeling Thresholds

```
for i = 1 to k do
    if s_i is a lower bound for the i^th circuit performance
      metric y_i then
        t_i ← ε^th percentile of y_i in U;
        if t_i > s_i then t_i ← s_i;
    else
        t_i ← (100-ε)^th percentile of y_i in U;
        if t_i < s_i then t_i ← s_i;
    end
end
```

FIG. 1.8

Algorithm 1.2

Algorithm 2: Assign Labels for Classifier Training

```
for i = 1 to n do
    for j = 1 to k do
        if s_j is a lower bound for the j^th circuit performance
          metric y_j then
            if y_j (i) ≥ t_j then
                ŷ_j(i) = +1;
            else
                ŷ_j(i) = -1;
            end
        else
            if y_j (i) ≤ t_j then
                ŷ_j(i) = +1;
            else
                ŷ_j(i) = -1;
            end
        end
    end
end
```

FIG. 1.9

Algorithm 1.3

Algorithm 3: Random Forest Algorithm

```
Let M = number of bootstrap samples ;
for i = 1 to M do
    Create a bootstrap sample G_i of size N;
    Train a single tree on G_i with a randomly selected
      subset of features;
end
ŷ(x) = (1/M) x Σ_{i=1}^{M} ŷ_i(x)
```

$$\hat{y}(x) = \frac{1}{M} \times \sum_{i=1}^{M} \hat{y}_i(x)$$

FIG. 1.10

Algorithm 1.4

Algorithm 4: Feature Importance by Permutation

```
Let M = number of bootstrap samples ;
for each predictor variable j do
    for tree t, t=1 to M do
        Get OOB error θ_t;
        Random permute observations of j;
        Get OOB error of the permuted set θ_j;
        θ_jt = θ_j - θ_t;
    end
    Let μ(θ_jt) be the mean of θ_jt across all trees, and σ(θ_jt)
      be the standard deviation of θ_jt across all trees;
    Feature importance of j = μ(θ_jt ) /  σ(θ_jt);
end
```

FIG. 1.11

Table 1.1

Table 1: Summary of Results for the design of the LNA with CALT

| Parameters | Specification Set 1 | Specification Set 2 |
|---|---|---|
| $M_1$=$M_2$ | 363.1 μm | 166.4 μm |
| $M_3$=$M_4$ | 165.9 μm | 247.8 μm |
| $M_5$ | 109.4 μm | 329.9 μm |
| $L_{g1}$=$L_{g2}$ | 8.39 nH | 9.61 nH |
| $L_{d1}$=$L_{d2}$ | 5.23 nH | 4.10 nH |
| $L_{s1}$=$L_{s2}$ | 1.03 nH | 0.836 nH |
| $C_{g1}$=$C_{g2}$ | 0.468 pF | 0.375 pF |
| $V_{b1}$=$V_{b2}$ | 0.661 V | 0.633 V |
| $V_{b3}$ | 0.883 V | 0.892 V |
| gain | 10.75 dB | 14.02 dB |
| NF | 2.88 dB | 2.79 dB |
| IP3 | -4.75 dBm | -4.63 dBm |
| power | 8.96 mW | 15.79 mW |
| min (max) Num. of iterations | 3 (5) | 9 (30) |
| avg Num. of iterations | 4 | 17 |
| min (max) Num. of samples | 1217 (1357) | 1630 (3100) |
| avg Num. of samples | 1287 | 2190 |
| min (max) execution time | 4.2 hr (6.5 hr) | 12.3 hr (41.1 hr) |
| avg execution time | 5.4 hr | 23.2 hr |

FIG. 1.12

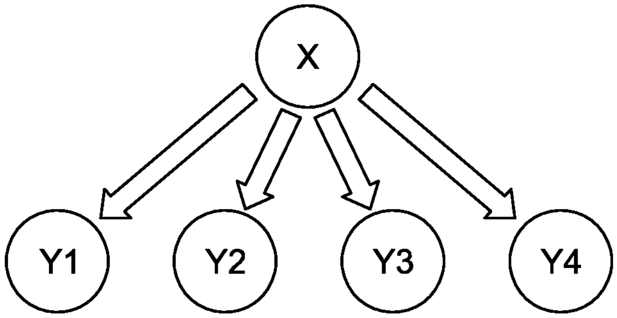
FIG. 2.1
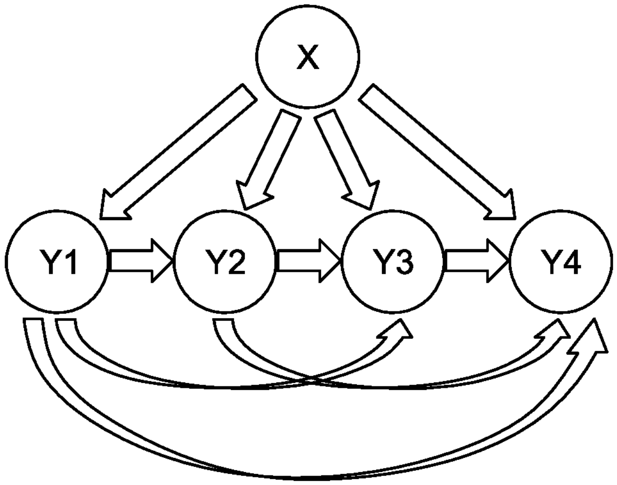
FIG. 2.2

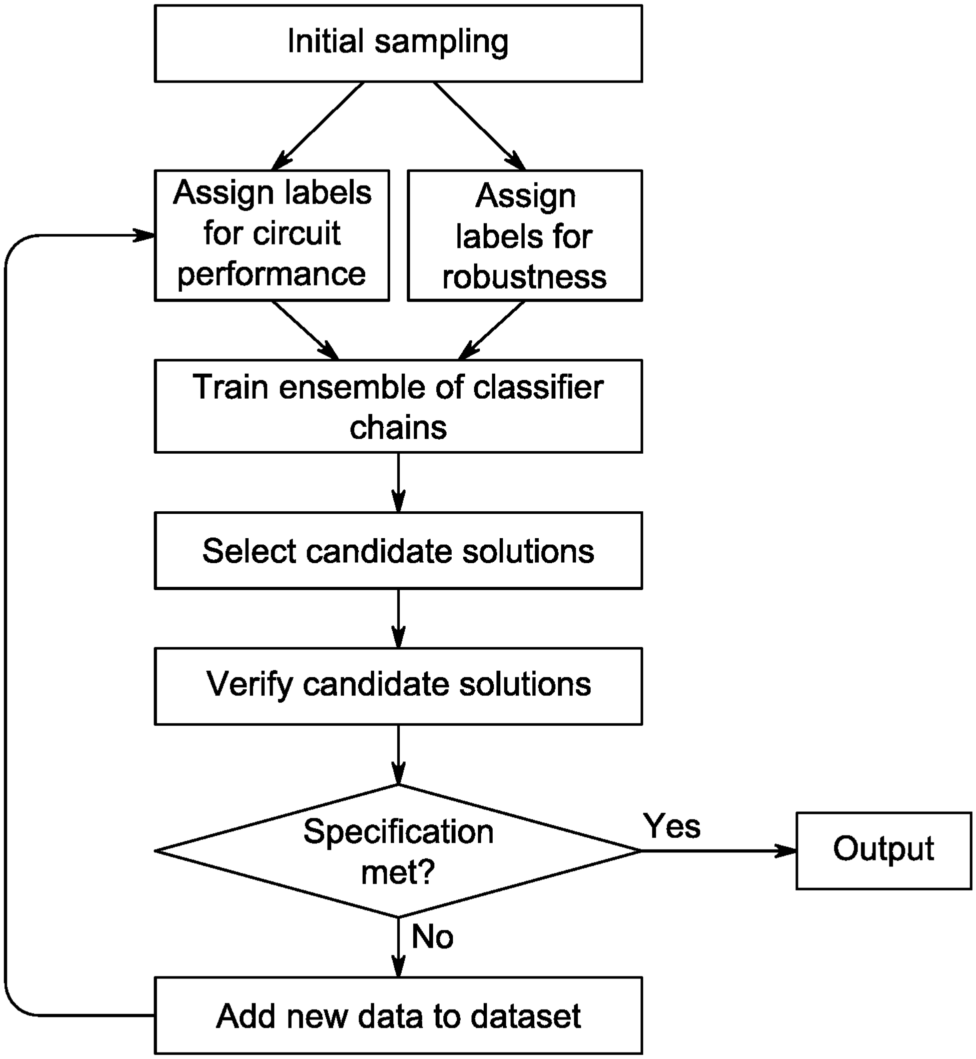
FIG. 2.3

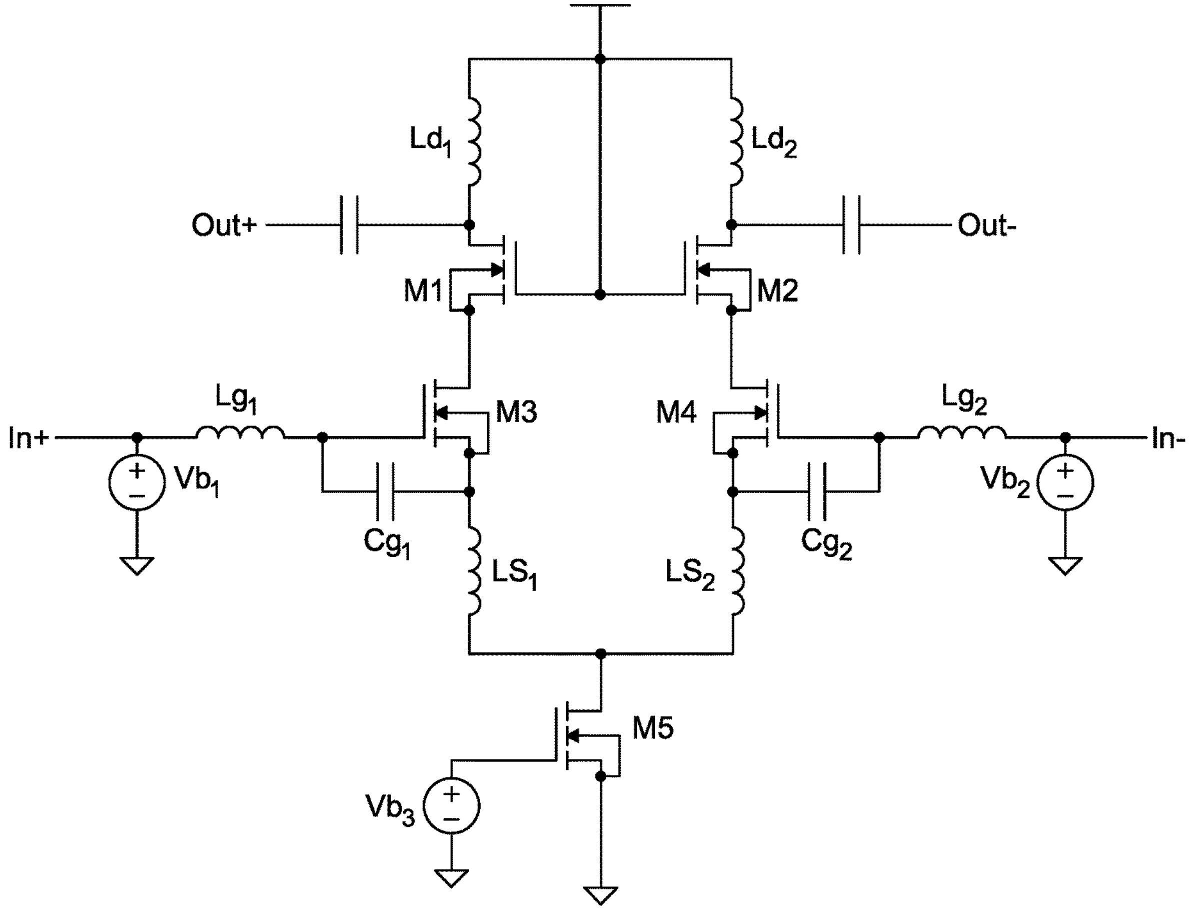
FIG. 2.4

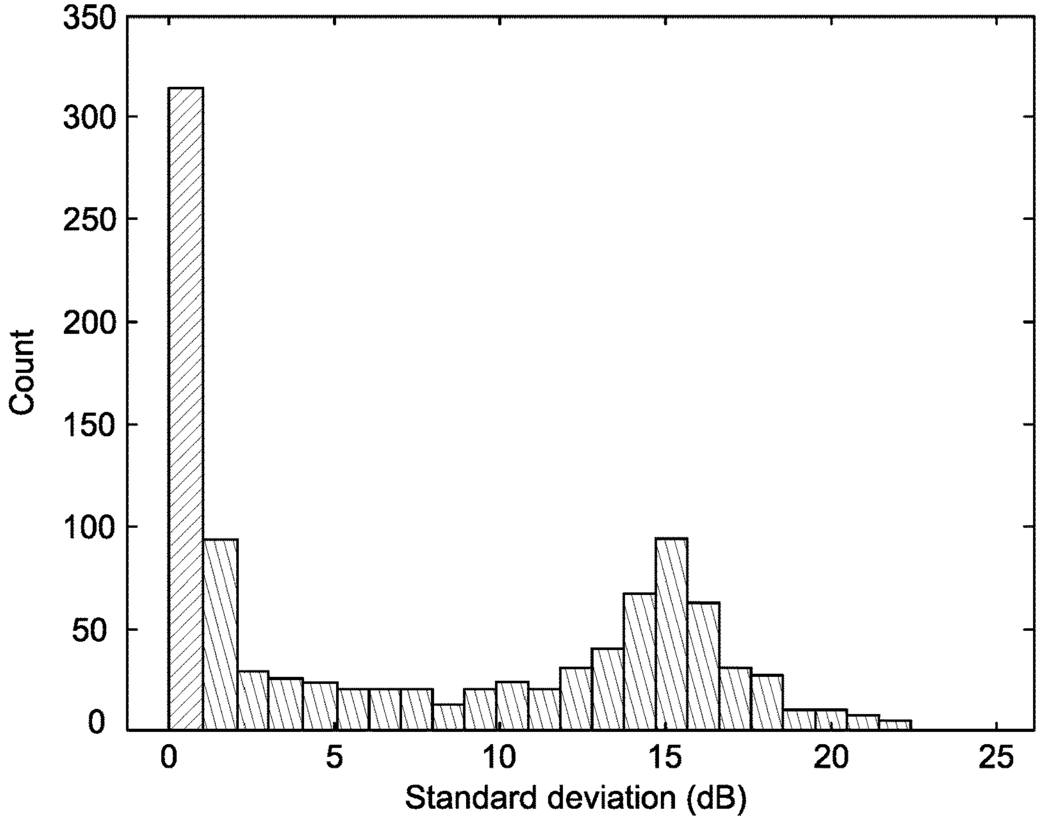
FIG. 2.5(a)
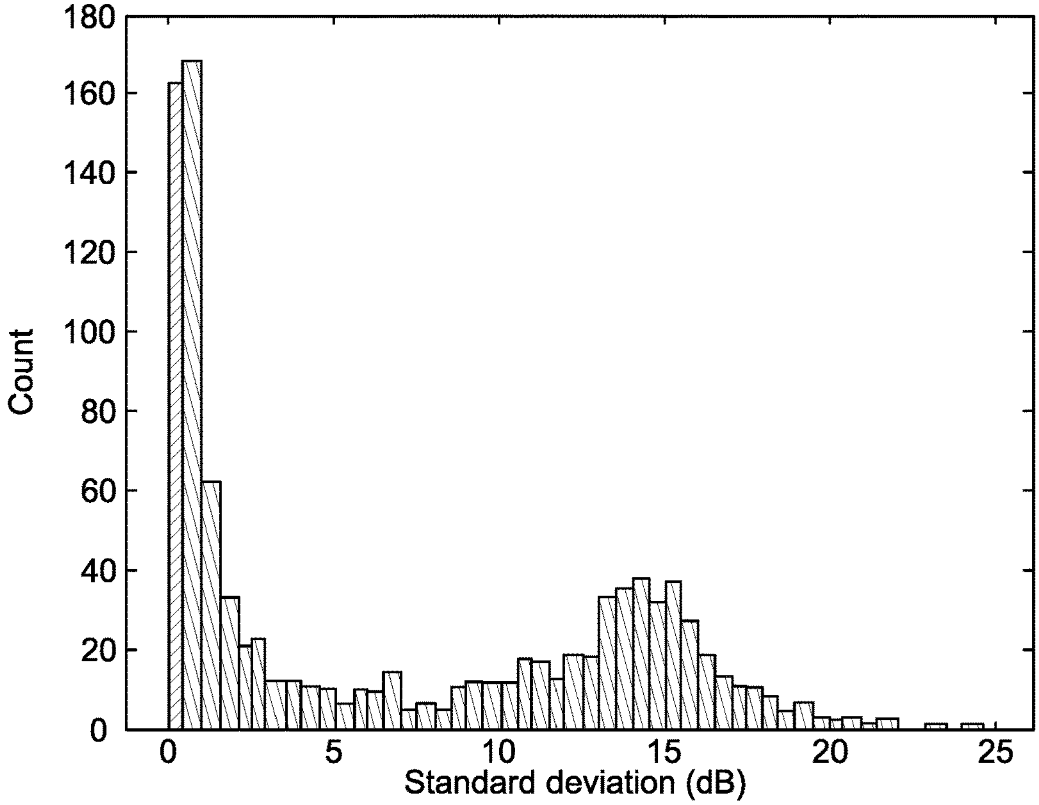
FIG. 2.5(b)

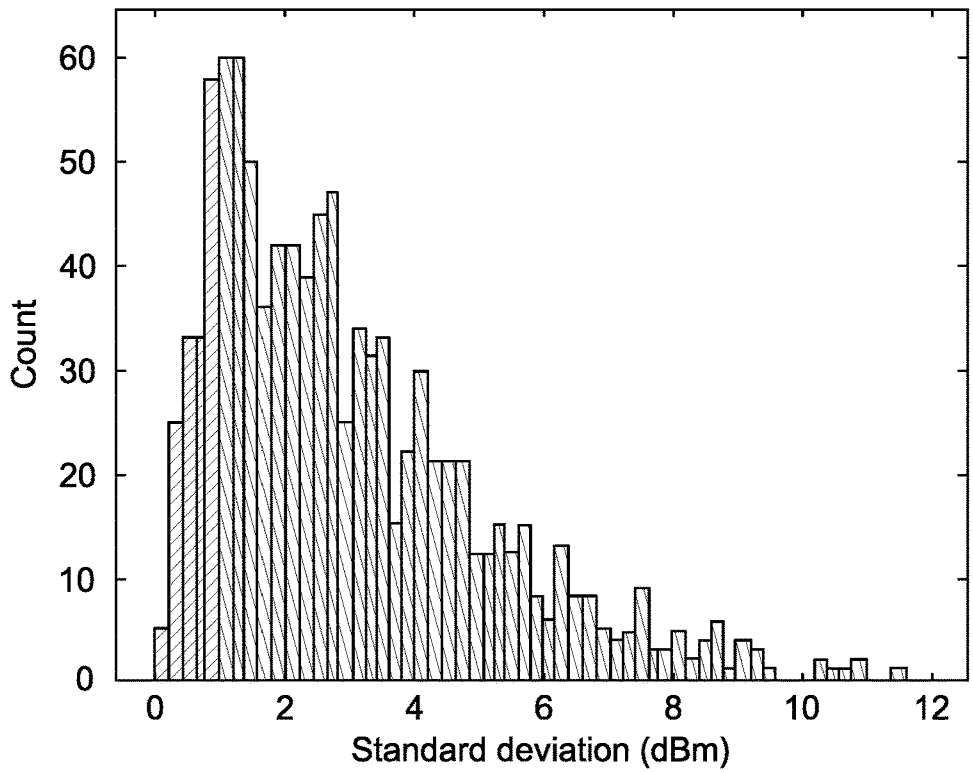
FIG. 2.5(c)
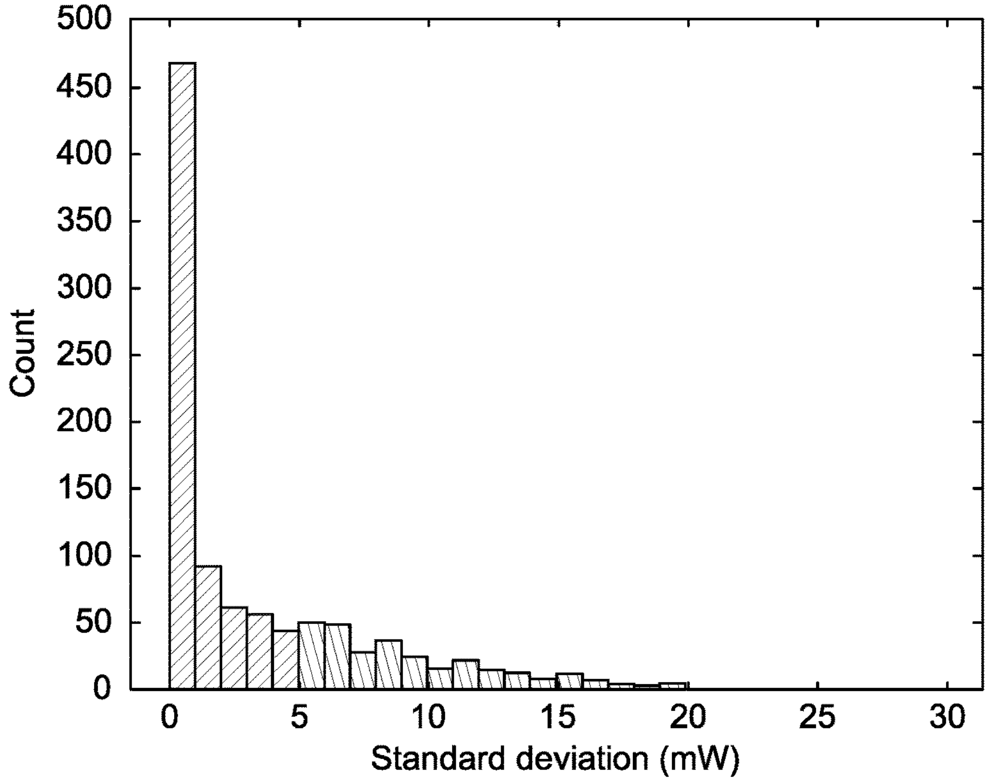
FIG. 2.5(d)

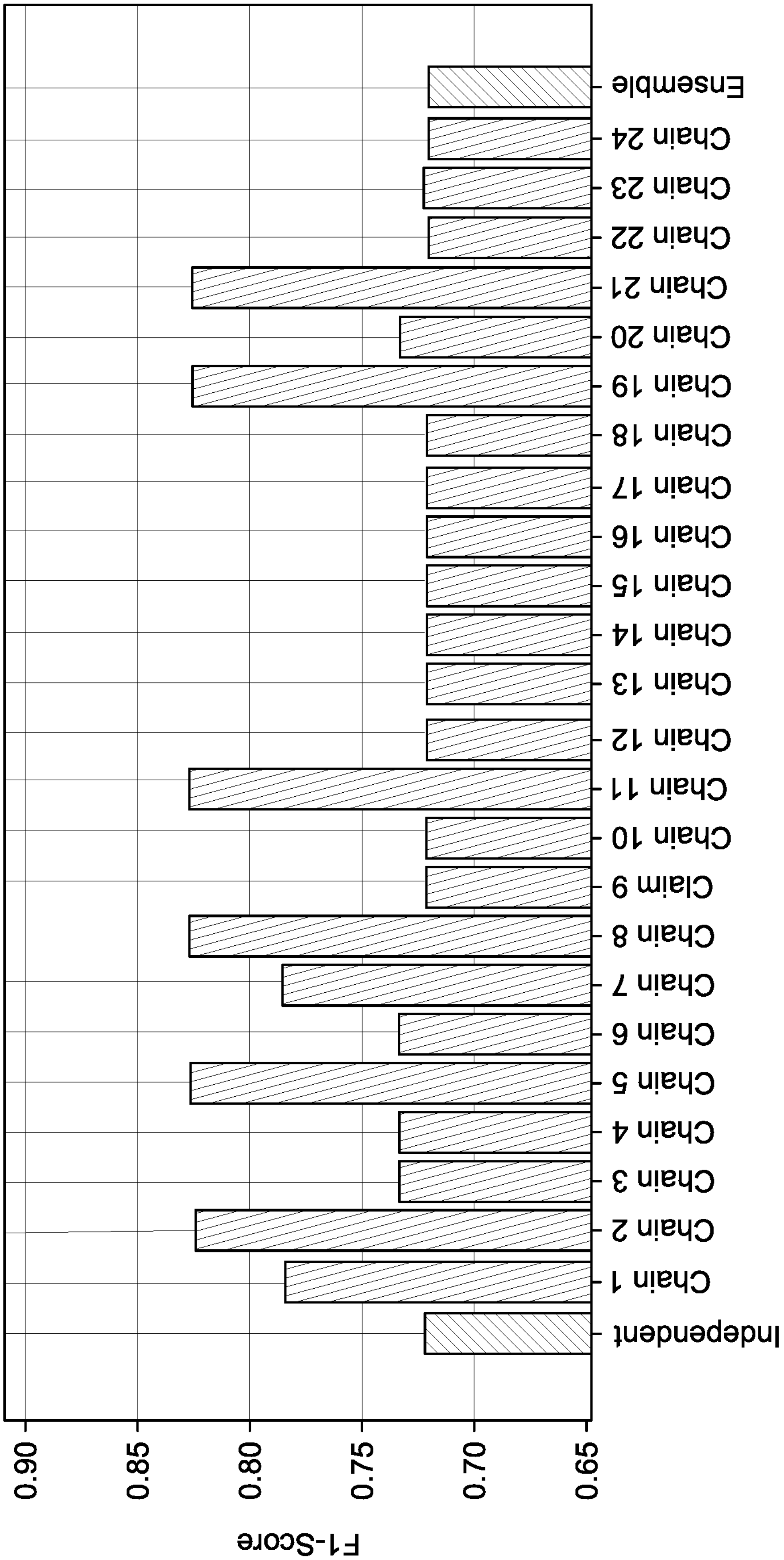
FIG. 2.6

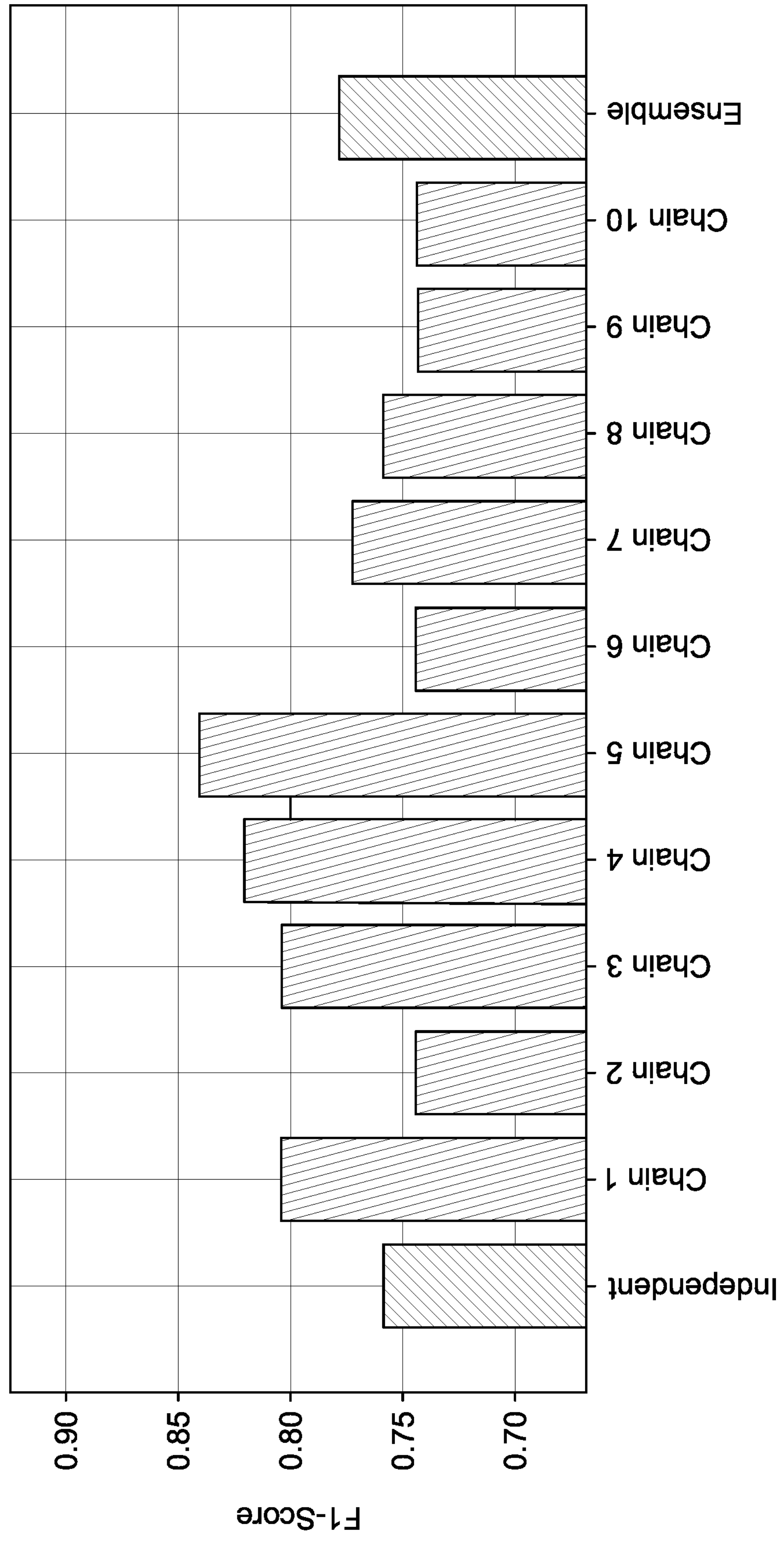
FIG. 2.7

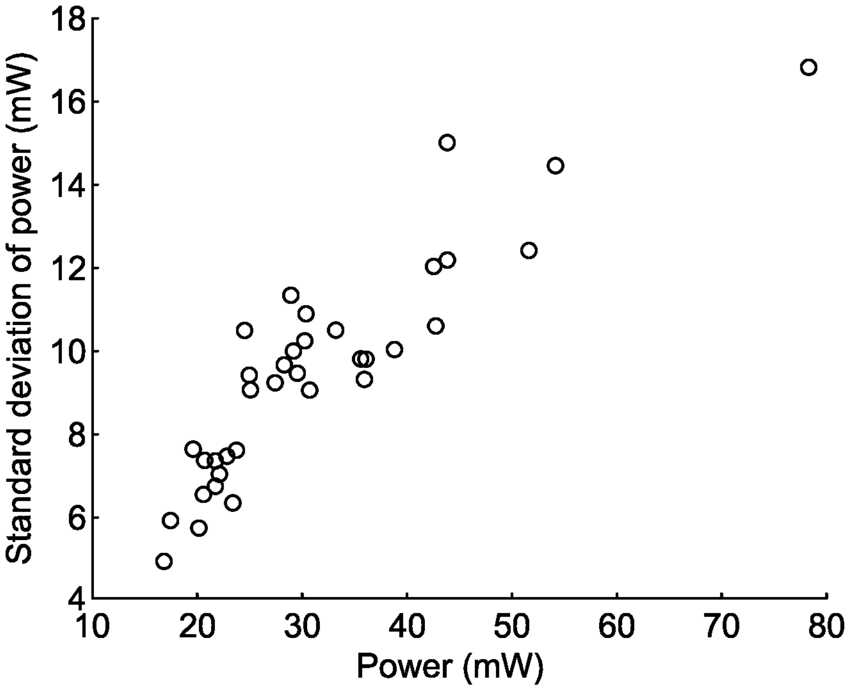
FIG. 2.8

Algorithm 2.1

Algorithm 1: Adaptively Set the Labeling Thresholds

```
for i = 1 to k do
    if s_i is a lower bound for the i^th circuit performance
      metric y_i then
        t_i ← ϵ^th percentile of y_i in U;
        if t_i > s_i then t_i ← s_i;
    else
        ti ← (100-ϵ)^th percentile of y_i in U;
        if t_i < s_i then t_i ← s_i;
    end
end
```

FIG. 2.9

Algorithm 2.2

Algorithm 2: Assign Labels for Classifier Training

```
for i = 1 to n do
    for j = 1 to k do
        if s_j is a lower bound for the j^th circuit performance
        metric y_i then
            if y_j (i) ≥ t_j then
                ŷ_j(i) = +1;
            else
                ŷ_j(i) = -1;
            end
        else
            if y_j (i) ≤ t_j then
                ŷ_j(i) = +1;
            else
                ŷ_j(i) = -1;
            end
        end
    end
end
```

FIG. 2.10

Algorithm 2.3

Algorithm 3: Assign Labels for Robustness Training

```
for i = 1 to n do
    for j = 1 to k do
        if σ_ij ≤ t_threj then
            ŷ_j(i) = +1;
        else
            ŷ_j(i) = -1;
        end
    end
end
```

FIG. 2.11

Algorithm 2.4

Algorithm 4: Training of a Classifier Chain

```
Training set U = (x(1), ŷ(1)), ... (x(n), ŷ(n));
Order the chain of the k classifiers as 1,2 ... k;
for j = 1 to k do
    Initialize U' as empty set;
    for (x, ŷ) ϵ U do
        U' = U' ∪ ((x, ŷ_1 ... ŷ_j-1), ŷ_j );
        train C_j : U' → ŷ_j ϵ {0,1};
    end
end
```

FIG. 2.12

Algorithm 2.5

Algorithm 5: Prediction with a Classifier Chain

```
Initialize Y as empty set;
for j = 1 to k do
    Y = Y ∪ (ŷ_j ← C_j : (x, y_1, y_2,....y_j-1));
end
return Y as prediction
```

FIG. 2.13

Algorithm 2.6

Algorithm 6: Prediction with Ensemble of Classifier Chains

```
Train m classifier chains;
for j = 1 to k do
    for i = 1 to m do
        Predict y_j with the i_th classifier chain;
    end
    y final_1 =sum(y_j)/m;
    Apply decision threshold to get ŷ final_1;
end
return Y = ( ŷ final_1,..., ŷ final_k ) as prediction
```

FIG. 2.14

TABLE I

Table 2.1

ORDERING OF THE SIX CLASSIFIER CHAINS WITH THE HIGHEST F1 SCORES, WHERE 0 REPRESENTS power, 1 REPRESENTS IP3, 2 REPRESENTS NF, AND 3 REPRESENTS gain.

| | |
|---|---|
| Chain 2 | 0 → 1 → 3 → 2 |
| Chain 5 | 0 → 3 → 1 → 2 |
| Chain 8 | 1 → 0 → 3 → 2 |
| Chain 11 | 1 → 3 → 0 → 2 |
| Chain 19 | 3 → 0 → 1 → 2 |
| Chain 21 | 3 → 1 → 0 → 2 |

FIG. 2.15

Table 2.2

TABLE II

SUMMARY OF THE RESULTS FROM THE DESIGN OF THE LNA USING THE ENSEMBLE OF 10 RANDOM CLASSIFIER CHAINS.

| Parameters | Generated Designs |
|---|---|
| $M_1$=$M_2$ | 290.5 μm |
| $M_3$=$M_4$ | 144.8 μm |
| $M_5$ | 137.6 μm |
| $L_{g1}$=$L_{g2}$ | 3.40 nH |
| $L_{d1}$=$L_{d2}$ | 3.98 nH |
| $L_{s1}$=$L_{s2}$ | 0.839 nH |
| $C_{g1}$=$C_{g2}$ | 0.565 pF |
| $V_{b1}$=$V_{b2}$ | 0.770 V |
| $V_{b3}$ | 0.957 V |
| gain | 10.75 dB |
| NF | 2.78 dB |
| IP3 | -2.65 dBm |
| power | 16.8 mW |
| $\sigma_{gain}$ | 0. 74 dB |
| $\sigma_{NF}$ | 0.45 dm |
| $\sigma_{IP3}$ | 0.47 dDm |
| $\sigma_{power}$ | 4.9 mW |
| Num. of iterations | 5 |
| Num. of samples | 21930 (1462x15) |

FIG. 2.16

VARIATION-AWARE ANALOG CIRCUIT SIZING WITH CLASSIFIER CHAINS

STATEMENT REGARDING GOVERNMENT SUPPORT

This invention was made with government support under Contract No. CNS-1751032 awarded by the National Science Foundation. The government has certain rights in the invention.

BACKGROUND

Traditionally, the design of an analog integrated circuit is completed by solving analytic equations that link design parameters with performance metrics. To automate the sizing of the components (transistors, capacitors, inductors, etc.) of an analog circuit, multi-objective optimization problems are formulated with analytic equations. The generated Pareto fronts provide a means to analyze the tradeoffs in circuit performance. However, with technology scaling, the knowledge-based approaches are limited by the is required to tune the circuit to resolve any mismatch between theoretically optimized results and simulation results.

Simulation-based approaches emerge as a substitute that addresses the challenges associated with knowledge-based optimization methods. Data mining and machine learning techniques may be used to extract modeling and design information from simulation data in a bottom-up approach. Representative techniques include stochastic pattern search, Bayesian optimization, and deep neural networks. Prior work has shown that simulation-based methods are successful in the design of analog circuits. However, improvements are needed with regard to the following.

Sample efficiency. Simulation-based methods rely on real-time sampling and optimization with simulation tools. The slow numerical solvers used for simulation limit the size of the dataset. To improve sample efficiency, a technique that samples from high-dimensional black-box functions with Duchon pseudo-cubic splines has been proposed. Another solution proposes using Bayesian neural networks that approximate the Pareto front with a reduced number of samples. Reducing the number of samples required by the optimization process to shorten the design time remains an open challenge.

Specification-driven design considerations: Based on the circuit requirements, analog design specifications may be grouped into two categories: 1) figure of merit (FoM) constraints that require optimization, and 2) hard constraints that must only be sufficiently met. As an example, power is treated as an FoM constraint when a design priority is to minimize the power consumption. In contrast, power consumption is treated as a hard constraint, specifically a power budget, when other circuit metrics are more critical.

FoM constraints may be commonly optimized by regression models. In practice, a limited number of circuit performance metrics are considered FoM constraints, for two primary reasons. First, when less important metrics are overemphasized, the search space is narrowed unnecessarily, which results in a more difficult or even infeasible search. Second, when more than two metrics are concurrently considered as FoM constraints, the Pareto fronts generated by multi-objective optimization algorithms such as NSGA-11 may be hard to visualize and apply. Tradeoff curves between two circuit metrics are meaningful only when the remaining specification-based metrics are satisfied.

In practice, specifications are often listed in the form of hard constraints, where the objective is to meet the set of target values. Applying classification to predict whether a candidate design point satisfies the specifications is well suited for analysis with hard constraints. In one approach, support vector machines (SVMs) are introduced to classify the performance space of analog circuits. One-class classifiers are favored over two-class classifiers as the latter suffers from a large dimensionality of the parameter space. Specifically, the proportion of design points that yield the desired performance parameters is likely to be small in an initial randomly sampled dataset. The dimensionality of the design space, therefore, limits the application of binary classifiers. Additionally, classifiers may only be applied for the analysis of the circuit performance space rather than for the design of the circuit.

Interpretability: Techniques that automate the design of a circuit must be interpretable and easy to use such that human efforts to apply the tools and algorithms are minimized. The black-box models and complex decision processes used by existing methods may be interpretable. Beyond the generation of design solutions, information such as performance tradeoffs, design space partitioning information, and importance rankings (sensitivity analysis) of design variables provide utility.

The automation of analog circuit design has drawn particular interest among the research community. The synthesis flow of an analog circuit consists of topology selection, component sizing, and physical design. The sizing of components, which includes both passive and active devices, is a critical step that ensures the selected circuit topology satisfies the target specifications. More recently, machine learning is explored as a means to facilitate the optimization of the sizing of an analog circuit.

The goal of applying machine learning is to learn and develop models to map from the design space to the performance space. A multi-label regression or classification problem is formulated, which is then solved by optimization algorithms. Classifiers may be applied to predict whether a design point satisfies the provided specifications. However, the interdependence among output labels has not been fully explored or used. The prediction models trained for the sizing of an analog circuit are improved by accounting for the relationships among the circuit performance metrics.

Another challenge for the automation of analog circuit design is the proper consideration of the effects that variations have on the output performances. Analog integrated circuits are sensitive to both inter-chip variations introduced by the fabrication process and intra-chip variations resulting from the discrepancy among parameters of individual transistors, such as deviations in the oxide thickness or the threshold voltage. In addition, during circuit operation, environmental effects including changes in temperature result in deviations in the performance of a circuit. With the variations in circuit parameters resulting in yield loss or improper operation, compensating for the effects of the variations increases the design complexity.

Therefore, design methodologies may account for the effects caused by circuit variations, while limiting any increase in design complexity. In past solutions, multiple variation-aware analog circuit sizing frameworks have been proposed. Direct optimization methods target maximizing the yield characterized by Monte Carlo analysis, which is an effective approach to simulate and model the effects due to variations. Probability density functions are generated from the density estimates of the Monte Carlo samples. However, the use of the Monte Carlo method is computationally expensive. Corner analysis is another approach for the characterization of the effects on circuit performance due to variations. In digital circuits, corner analysis is applied specifically to account for the effects of variations on timing and power consumption. Typically, in addition to temperature and voltage, five process corners may be considered: typical-typical (TT), fastfast (FF), slow-slow (SS), slow-fast (SF), and fast-slow (FS). The utilization of electronic design automation (EDA) tools such as Cadence allows for the numerical simulation of circuit performances at different process corners and temperatures. Design solutions are considered robust if the specifications are satisfied for all corner cases, or fall within a certain standard deviation from the specifications for all corner cases. Designing for the worst case guarantees robustness but usually results in over-design or renders the problem infeasible to implement. Another approach is design centering, which selects design solutions that are farthest from the specification boundaries so that process and environmental variations are tolerated.

SUMMARY OF THE EMBODIMENTS

The inventors propose a simulation-based optimization framework that sizes analog circuit components to meet the design specifications while constraining the variations in the performance of the circuit across all corners of interest within a set bound. Classifier chains are used that represent the relationships among output parameters to improve the model accuracy and to provide additional design insight after the completion of the automated sizing methodology.

BRIEF DESCRIPTION OF THE DRAWINGS

The figures supplement the description.

FIG. 1.1 shows a proposed flow that applies to classification with adaptive labeling thresholds to the design of the analog circuit.

FIG. 1.2 shows a circuit schematic of a differential low noise amplifier.

FIG. 1.3 shows a generated pareto front between gain and NF when power and IP3 constraints remain satisfied.

FIGS. 1.4(*a*) and 1.4(*b*) show a change in 1.4(*a*) the 95th percentile of the gain distribution and 1.4(*b*) the 5th percentile of the NF distribution with each iteration of the CALT algorithm. The results are used to determine the labeling threshold of the gain and NF.

FIG. 1.5 shows cross-validated F1-scores of the random forest classifiers for the gain, NF, IP3, and power, when targeting Specification Set 2.

FIG. 1.6(*a*)-(*d*) show variable importance rankings extracted for a) gain, b) NF, c) IP3, and d) power for target Specification Set 2 after completion of the CALT circuit sizing flow.

FIG. 1.7 show a decision tree for NF prediction trained with the final dataset after the completion of the component sizing flow targeting Specification Set 2.

FIG. 1.8 shows Algorithm 1.1.

FIG. 1.9 shows Algorithm 1.2.

FIG. 1.10 shows Algorithm 1.3

FIG. 1.11 shows Algorithm 1.4.

FIG. 1.12 shows Table 1.1.

FIG. 2.1 show a diagram depicting a multi-label classification based on the binary relevance approach.

FIG. 2.2 show a diagram depicting a classifier chain that maps from the input feature space to a four-dimensional output space.

FIG. 2.3 show a proposed design flow that uses classifier chains for the sizing of an analog circuit.

FIG. 2.4 shows a circuit schematic of a differential low noise amplifier.

FIGS. 2.5(*a*)-(*d*) shows a distribution of standard deviations of the performance variations across the 15 corner cases for the initial 1000 data points acquired for FIG. 2.5(*a*) gain, FIG. 2.5(*b*) NF, FIG. 2.5(*c*) IP3, and FIG. 2.5(*d*) power consumption.

FIG. 2.6 shows average F1-scores for the standalone classifiers based on binary relevance (red), all 24 possible orders of classifier chains (blue) of the four performance parameters, and the ensemble of classifier chains (green) for the prediction of the four circuit performance parameters for the standard typical corner at 20° C.

FIG. 2.7 shows average F1-scores for the standalone classifiers based on binary relevance (red), 10 random orders of classifier chains (blue), and the ensemble of the 10 random orders of classifier chains (green) for the prediction of the eight target performance parameters, where four circuit specification parameters and four robustness parameters are predicted.

FIG. 2.8 shows relationship between the power consumption and the standard deviation of the power consumption variation, σPower, when all remaining performance and robustness constraints are satisfied.

FIG. 2.9 shows Algorithm 2.1.

FIG. 2.10 shows Algorithm 2.2.

FIG. 2.11 shows Algorithm 2.3.

FIG. 2.12 shows Algorithm 2.4.

FIG. 2.13 shows Algorithm 2.5.

FIG. 2.14 shows Algorithm 2.6.

FIG. 2.15 shows Table 2.1.

FIG. 2.16 shows Table 2.2.

DETAILED DESCRIPTION OF THE EMBODIMENTS

1. Classification with Adaptive Labeling Thresholds for Analog Circuit Sizing To address the limitations of existing techniques, the inventors developed a batchmode online to design analog integrated circuits through classification with adaptive labeling thresholds (CALT). The method may be an improvement over the art for the following reasons: 1) the application of classifiers for both the modeling of the performance space and the sizing of an analog circuit, 2) the use of interpretable tree-based algorithms for surrogate modeling, and 3) a strategy to adaptively set the labeling thresholds for the training of the classifiers such that the lack of positively labeled data is resolved.

1.1 Proposed Methodology

With CALT, the sizing of the components of an analog circuit is performed by the sequential completion of two tasks: multioutput classification for performance modeling of a circuit, and optimization for the generation of the component sizes for the circuit

1.2.1 Classification with Adaptive Labeling Thresholds

Given the problem of sizing the components of an analog circuit, denote the design space as $X \subseteq R^d$, and the performance space as $Y \subseteq R^k$. Initially, a dataset U=((x (1), y(1)), . . . (x(n),y(n)))∈(X Y)$^n$ is sampled from the design space. Latin Hypercube Sampling (LHS) is applied, where LHS is a Monte Carlo method that provides a quasi-random sampling distribution. For a pre-specified sample size n, the design space is partitioned into equal regions, and a single point is randomly selected in each region.

After the initial dataset is generated, binary labels are assigned to each data point for each circuit performance metric based on whether a target threshold is met. The labeled space is denoted as Y^⊆{+/−1}$^k$. The objective then becomes to train a classifier hk:X→Y^k for the kth circuit performance metric that, given a new instance x∈X, predicts y^k=hk(x)∈Y^k. A multi-output classification problem is, therefore, formulated.

A possible choice for the labeling threshold is the design specification. However, if the dimensionality of the design space is large, the initial dataset is unlikely to contain sufficient data points with positive labels for training. Instead, for a target specification, the labeling threshold is set to the eth percentile of the distribution of a given circuit performance metric in the dataset U as a lower bound, and the (100−e)th percentile of the distribution as the upper bound. If the corresponding specification exceeds the percentile value, the dataset contains enough positively labeled data points and the threshold is, therefore, set to the specification. Given the design specification set S⊆Rk for s∈S, the labeling threshold set T⊆R$^k$ for t∈T is generated as given by FIG. 1.8, Algorithm 1.1. Binary labels are then assigned to each circuit performance metric based on whether the target set T is met, as given by FIG. 1.9, Algorithm 1.2.

Precision and Recall may be used to evaluate the performance of the classifiers, which are defined as follows:

Precision=# of true positives/# of positive predictions EQ. 1.1

Recall=# of true positives/# of positive instances EQ. 1.2

Combining Precision and Recall results in the F1-score, which is used as a single metric that evaluates the performance of a classifier, as given by Equation 1.3.

$F1\text{-score}=2\times(\text{precision}\times\text{recall})/(\text{precision}+\text{recall})$ EQ. 1.3

1.2.2 Applying Random Forest for Classification

Decision tree (DT) algorithms may be applied to map from the circuit specifications to the circuit topology by using past designs as reference. In this work, DT-based algorithms are used due to the following advantages:

- Tree-based models are fast to train while providing comparable prediction accuracy to other methods including neural networks,
- A small number of hyper-parameters require tuning, while data pre-processing is not necessary,
- Design space partitioning information is provided through the tree-structured models, and
- Feature importance rankings are generated.

To train a decision tree, the Gini index GI is applied as the node splitting criteria, which is defined as:

$$GI = 1 - \sum_i f(i)^2 \quad \text{EQ. 1.4}$$

where f(i) is the fraction of positive instances for the ith node split. The tree is grown by finding the largest reduction in the Gini index.

Ensemble techniques are applied to reduce model overfitting, which results from using single tree models. In the inventors' work under this section, the random forest algorithm is used, which draws samples with replacement from the dataset for the training of a bag of deep trees with a subset of the features. The final prediction is obtained by averaging the individual predictions produced by the models, as given by FIG. 1.10, Algorithm 1.3.

The execution of the random forest algorithm provides the importance ranking of the design variables. During each iteration of bootstrap training, a single tree model is trained from the bootstrap samples and tested with the remaining samples. The comparison of the samples results in an out-of-Bag (OOB) error. The average of the OOB errors from all runs of bootstrap training is an estimate of the performance of the ensemble. Through random permutations of a feature set, the importance of a design parameter is determined by characterizing the impact of the changes on the OOB error, as described by the pseudocode provided as FIG. 1.11, Algorithm 1.4.

1.2.3 Optimization-Based Active Querying

After the classifiers for each performance metric are trained, qualified designs are determined from the intersection of the feasible regions of all models. A multi-objective search is executed for each iteration of the simulation loop to search for points such that the predicted probability scores of all models are simultaneously maximized. The candidate solutions are given as:

$$x^* \in \operatorname{argmax}(p_1(x), \ldots, p_{k(x)}) \quad \text{EQ. 1.5}$$

where $p_{k(x)}$ is the probability score predicted by the kth classifier. The design points are then verified through SPICE simulation (Cadence Virtuoso herein).

1.2.4 Summary of the Design Flow of CALT

As shown in FIG. 1.1, the design flow of CALT includes six primary steps, which are described as:

1) Initialization through the generation of random points in the design space with LHS. Execution of an automation script (OCEAN) to evaluate the performance of the circuit for each selected point with SPICE simulations,
2) Adaptively assigning a binary label to each performance metric of each selected point with Algorithm 1.1,
3) Training a random forest classifier for each performance metric with the dataset,
4) Running the multi-objective search algorithm NSGA-II on all of the model functions to generate design points and writing the resulting points to a data file,
5) Automation of the reading of the design points and execution of the SPICE simulations to evaluate the performance of the circuit with the generated component sizes, and
6) If no design point meets all of the specifications, add the verified data points to the dataset, and return to step 2.

1.3 Simulation Results

CALT is applied to the design of an inductively degenerated differential low noise amplifier (LNA), which is shown in FIG. 1.2. The target operating frequency of the LNA is 2.4 GHz in a 65 nm technology.

The design set may include nine variables: the sizes of the inductors Lg1, Ld1, and Ls1, the widths of transistors M1, M3, and M5, the size of capacitor Cg1, and the biasing voltages Vb1 and Vb3. Due to the symmetry of the differential structure, the remaining variables are set to the same values as the corresponding counterparts. The transistor length is set to the minimum of 65 nm. The performance set includes the power gain, noise figure (NF), third-order intercept point (IP3), and power consumption. The target design variables are constrained as:

$$60\ \text{nm} \leq \text{transistor widths} \leq 900\ \mu\text{m}, \quad \text{EQ. 1.6}$$
$$0.01\ \text{nH} \leq \text{inductor sizes} \leq 12\ \text{nH},$$
$$30\ \text{fF} \leq \text{capacitor sizes} \leq 20\ \text{pF, and}$$
$$0\ \text{V} \leq \text{biasing voltages} \leq 1.2\ \text{V}$$

Two different sets of design specifications are targeted, the first given as Specification Set 1:

$$\text{Gain} \leq 10\ \text{dB}, \quad \text{EQ. 1.7}$$
$$NF \leq 3\ \text{dB},$$
$$IP3 \geq -5\ \text{dBm, and}$$
$$\text{Power} \leq 10\ \text{mW}$$

and the second as Specification Set 2:

$$\text{Gain} \geq 14\ \text{dB}, \quad \text{EQ. 1.8}$$
$$NF \leq 2.8\ \text{dB},$$
$$IP3 \geq -5\ \text{dBm, and}$$
$$\text{Power} \geq 20\ \text{mW}$$

An initial dataset of 1000 points is sampled with LHS. After verifying that the dataset contains no points that satisfy all of the specifications, CALT is executed to solve for the nine design variables for both sets of target specifications, where $\in$, as described herein, is set to 95. Five runs of CALT are executed for each of the target specification sets. A summary of the results is provided in FIG. 2.15, Table 1.1.

As indicated by the results listed in FIG. 2.15, Table 1.1, qualified solutions are returned by CALT for both sets of target specifications. The Pareto fronts from the verified design points are provided in FIG. 1.3, where the tradeoff between the gain and NF of the LNA is shown. Since the power budget for Specification Set 2 is set to be 10 mW greater than that for Specification Set 1, the Pareto front for Specification Set 2 is closer to the upper-left corner of FIG. 1.3. In addition, an average of 17 iterations are needed to determine the design variables for Specification Set 2, as compared to four iterations required for Specification Set 1, as listed in FIG. 2.15, Table 1.1. Both specification sets are distinct since one targets lower power consumption, while the other targets a lower NF and higher gain by allowing for a higher power budget.

The total execution time for CALT consists of the time for initial sampling, offline model training and optimization, and verification through online simulation. As listed in FIG. 2.15, Table 1.1, the execution time of CALT is in the range of 4.2 to 6.5 hours for Specification Set 1, and 12.3 to 41.1 hours for Specification Set 2, which indicates a large variation in the convergence speed of the stochastic CALT design framework, especially for the more stringent parameter requirements of Specification Set 2.

The data plotted in FIGS. 1.4(*a*), 1.4(*b*), and 1.5 is from the run of the CALT algorithm with the fastest execution time. The changes in the labeling thresholds of the gain and NF for each executed iteration of the algorithm are shown in FIGS. 1.4(*a*) and 1.4(*b*). The 95th percentile of the gain distribution exceeds 10 dB after completion of the second iteration of the CALT algorithm when solving for Specification Set 1, and exceeds 14 dB after completion of the fourth iteration of the CALT algorithm for Specification Set 2. Thereafter, the labeling thresholds are maintained at 10 dB and 14 dB, respectively. In comparison, the 95th percentile of the IP3 distribution and the 5th percentile of the power distribution exceed the corresponding target specifications beginning with the initial dataset, which indicates that the dataset contains sufficient points with positive labels for the two circuit metrics. Therefore, the labeling thresholds for IP3 and power are set to the corresponding specifications from the start of execution of the CALT design flow.

The F1-scores of the classifiers for each of the four performance metrics when solving for Specification Set 2 are shown in FIG. 1.5. The performance of the gain and NF classifiers is poor initially and improves as the number of iterations increases. In contrast, the performance of the power and IP3 classifiers is relatively constant for all iterations. The difference in the performance of the classifiers is due to the change in the labeling thresholds when training the models for gain and NF. The results indicate that the convergence to qualified design solutions is shown to be correlated with the performance of the surrogate prediction models.

After sizing the components of the LNA with CALT, importance rankings of the design variables are extracted from the random forest models, as shown in FIG. 1.6. The size of inductor Ls1 (Ls2) results in the greatest impact on all metrics except for the power consumption, as Ls is critical for input matching. The rankings also reveal the significant impact of the two biasing voltages Vb1 (Vb2) and Vb3 on IP3 and power consumption, which are large-signal circuit performance metrics. The automatically extracted importance rankings allow for the narrowing of the input search space to a small set of critical design variables. In comparison, for manual custom design, both analytic formulae and design expertise are needed to identify the critical design variables best suited for the optimization of a performance metric.

As a final step, decision trees are trained with the final dataset. A tree for NF prediction trained with the final dataset generated from completion of the CALT sizing methodology on Specification Set 2 is shown in FIG. 1.7. The design space is partitioned by the tree model, and decision paths are shown that serve as criteria on whether a design point is expected to satisfy the specified NF.

1.4 Discussion

If the topology and technology node are fixed, the design space of an analog circuit may also be fixed. The necessary partitioning details of the design space are, therefore, learned by CALT from simulation data. With the binary classifiers, decision boundaries between feasible and infeasible regions are identified for a given specification. The optimizations are used to search for design points in the common feasible regions of all models. As new design points are actively queried, more information on both the design space and the performance space is gathered. The performance of the classifiers, therefore, improves, which results in the convergence to a design solution.

Fine-tuning of the surrogate models is performed with the proposed closed-loop learning system. The dataset determined during the final iteration of the sizing flow is considered as the minimum required for convergence to a design solution. The CALT framework is driven by the circuit specifications, which allows for customized designs of analog circuits, where the specifications are adjusted based on the design needs.

2. Introduction & Background—Variation-Aware Analog Circuit Sizing with Classifier Chains

2.1 Introduction

The inventors propose a simulation-based optimization framework that sizes analog circuit components to meet the design specifications while constraining the variations in the performance of the circuit across all corners of interest within a set bound. Classifier chains are used that represent the relationships among output parameters to improve the model accuracy and to provide additional design insight after the completion of the automated sizing methodology.

2.2 Proposed Methodology

For the component sizing of an analog circuit, the design space is denoted as X⊆Rd and the performance space as $Y \subseteq R^k$. Assume an initial dataset U=((x(1), y(1)), . . . , (x(n), y(n)))∈ $(X \times Y)^n$ is randomly sampled from the design space. Binary labels are then assigned to each selected data point of each circuit performance metric based on whether a target threshold is met. The labeled space is denoted as $Y \subseteq \{\pm 1\}^k$. One classifier is trained to map $h_k$: X->$Y_k$ for the kth circuit performance metric. Therefore, a multi-label classification problem is formulated. A technique ma use adaptive labeling thresholds to train the classifiers. The procedure to determine the set of performance metric thresholds T from the provided specification set S is given by FIG. 2.9, Algorithm 2.1, while the routine to assign the labels for training is given by FIG. 2.10, Algorithm 2.2. The tree-based XG-Boost algorithm is used for classification.

2.2.1 Variation-Aware Circuit Sizing

When considering the effects of variations on circuit performance, simulations for each design point are acquired at each corner of interest. The standard deviations of the performance variations across all of the corners for each design point are then calculated. Design points with performance fluctuations that fall below the set threshold $T_{thre}$ of the standard deviation are assigned with positive labels, while all other points are assigned negative labels. The pseudo-code to set the robustness labels is given by FIG. 2.11, Algorithm 2.3. Therefore, for a set of target performances of dimension k, a total of 2 k classifiers are trained with k performance predictions and k robustness predictions.

2.2.2 Classifier Chains

For a multi-label classification problem, the traditional approach is to train one binary classifier for each labeled target performance metric as shown in FIG. 2.1, which is known as the binary relevance (BR) approach. However, BR is based on the assumption that output labels are independent of each other. Research has shown that leveraging the relationships among output labels improves the generalization and application of the trained models.

Herein classifier chains may be adopted to model the interdependencies among the outputs. A representation of a classifier chain is shown in FIG. 2.2. With classifier chains, a set of binary classifiers are combined during the training phase by including output labels from the previous stages as an additional feature set During the prediction phase, since the true labels are not available, the predictions from the preceding classifier models of the chain are applied instead as features for prediction by the subsequent classifier models in the chain. The procedure to train the classifier chain is described by FIG. 2.12, Algorithm 2.4. The procedure for prediction with the trained classifier chain is described by FIG. 2.13, Algorithm 2.5.

With classifier chains, the correlation among target labels is considered. The order in which the classifiers are organized is a key parameter that affects the performance of the model. The first model in the chain is a classifier trained on the original input features, while additional output features are included as training features in the remaining models of the chain.

2.2.3 Ensemble of Classifier Chains (ECC)

An ensemble improves the prediction accuracy of a model and reduces model overfitting. When considering an ensemble of classifier chains, a total of m chains are trained, which are denoted as C1, C2, . . . , Cm. If enumeration of all the possible orders of the chain is possible, then m=k! classifier chains are trained, where k is the number of output labels. When m<k!, each classifier chain in the ensemble is trained with a random ordering of individual classifiers. The predictions are summed and averaged for each label. A threshold is used to determine the final predicted labels. The pseudo-code for prediction by the ensemble of classifier chains is given by FIG. 2.14, Algorithm 2.6.

1.2.4 Design Flow for Variation-Aware Component Sizing with Classifier Chains The classifiers for predicting the circuit parameters are trained on a 'default' standard corner, which was set to TT at 20C in this work. The classifiers for predicting robustness are trained with the standard deviations calculated for all corners (e.g., process, voltage, and temperature) and for each design point (selected component sizes).

After the training of the ensemble of classifier chains, for each iteration of the design loop shown in FIG. 2.3, a multi-objective search is executed to determine points that simultaneously maximize the predicted probability scores for all of the specifications, as given by:

$$x^* \in \operatorname{argmax}(p_1(x), \ldots, p_{k(x)}, r_1(x), \ldots, r_k(x)) \quad \text{EQ. 2.1}$$

where pk(x) is the probability score to predict whether the kth circuit performance parameter satisfies the target specification, and rk(x) is the probability score to predict whether robustness is satisfied for the kth circuit performance parameter. Both the pk(x) and rk(x) scores are outputs from the classifier chain. SPICE simulations are then executed to verify the candidate solutions.

The proposed framework is applied to the design of a differential low-noise amplifier (LNA), which is shown in FIG. 2.4, in a 65 nm technology. The design set consists of nine variables: the sizes of inductors Lg1, Ld1, and Ls1, the widths of transistors M1, M3, and M5, the size of capacitor Cg1, and the biasing voltages Vb1 and Vb3. The sizes of the remaining components are set based on symmetry. The transistor length is set to the minimum of 65 nm. The target performance metrics include the gain, noise figure (NF), third-order intercept point (IP3), and power consumption. The target design variables are constrained to:

$$60\text{ nm} \leq \text{transitor widths} \leq 900\ \mu\text{m},\quad 0.01\text{ nH} \leq \text{inductor sizes} \leq \text{nH},\quad 30\text{ fF} \leq \text{capacitor sizes} \leq 20\text{ pF, and}\quad 0\text{ V} \leq \text{biasing voltages} \leq 1.2\text{ V} \qquad \text{EQ. 2.2}$$

The specifications for the performance metrics of the circuit are given as:

$$\text{Gain} \geq 10\text{ dB},\quad NF \leq 2.8\text{ dB},\quad IP3 \geq -5\text{ dBm, and}\quad \text{Power} \leq 20\text{ mW} \qquad \text{EQ. 2.3}$$

and the robust requirements of the circuit are given as $$\sigma_{Gain} \leq 1\text{ dB},\quad \sigma_{NF} \leq 0.5\text{ dB},\quad \sigma_{IP3} \geq 1\text{ dBm, and}\quad \sigma_{Power} \leq 5\text{ mW} \qquad \text{EQ. 2.4}$$

The initial dataset contains 1000 design points. 15 corner cases are simulated for each design point, which are given by the combination of the three temperatures of 20° C., 80° C., and 120° C., and the five process corners of TT, FF, SS, SF, and FS. The TT process corner at 20° C. is considered as the default standard case, while the remaining corner cases are acquired primarily for characterizing the variations in the performance of the circuit. For the initial acquired dataset, the distribution of standard deviations of the variations in the performance across the 15 corner cases is shown in FIGS. 2.5(*a*)-(*d*). The striped bars indicate the design points that satisfy the user-specified robustness criterion for each performance specification, while the cross bars indicate the design points with performance variations that exceed the set thresholds. Without accounting for robustness, the generated design solutions potentially result in large variations in the circuit performance parameters at different corners (falling to the right side of each plot in FIGS. 2.5(*a*)-(*d*).

After the initial dataset is acquired, the design flow is executed with the adaptive labeling threshold method applied to the performance specifications. The term, as defined in FIG. 2.9, Algorithm 2.1, is set to 95. For the prediction of the robustness of the circuit, as the initial dataset contains sufficient data points with both positive and negative labels, the labeling thresholds on the standard deviations that constrain the variation in the performance parameters are set directly to the target values.

Classifier chains are first trained only on data from the standard corner case without considering variations. For the four circuit performance metrics, there are 4! (24) combinations of possible orderings of the chain. Classifier chains with all 24 possible combinations are trained. The results from the characterization of the performance of the models are shown in FIG. 2.6.

From the results shown in FIG. 2.6, the best six classifier chains produce F1 scores that outperform the independent models trained based on the binary relevance method by more than 0.1 points. The orders of the six chains are listed in FIG. 2.15, Table 1.1, with 0 representing power, 1 representing IP3, 2 representing NF, and 3 representing gain.

Among the six optimal classifier chains, the prediction of the noise figure is always placed last in the chain, which indicates that the prediction of the noise figure is the least accurate and provides the least information to the training of the other classifiers. The classifier chain provides higher performance when models with the highest confidence are placed first, while inaccurate models are placed near the end of the chain so that any error is minimally propagated along the chain.

Including an additional four classifiers to account for the prediction of the robustness of the circuit to variation, the chain now consists of eight classifiers. As the enumeration of 8! combinations to identify the optimal chain sequence is computationally expensive, 10 random combinations of the eight classifiers are trained. Execution of FIG. 2.14, Algorithm 2.6 provides a prediction of the robustness of the circuit with the ensemble of 10 random classifier chains. The results of the performance of the model are shown in FIG. 2.7. The results indicate that the ensemble outperforms the trained standalone classifiers.

The design flow, as depicted in FIG. 2.3, is then executed based on the ensemble of the 10 random classifier chains. A summary of the results for the design of the LNA is provided in FIG. 2.16, Table 2.2. A qualified design solution is generated that satisfies both the specification and robustness requirements after five iterations of the training/inference loop of the ensemble of classifier chains. The total number of design points simulated is 1462, with 1000 points for the initial dataset and 462 points generated while executing the design loop, where an average of 92 candidate solutions are generated each iteration. Each design point requires 15 simulations to account for all corner cases.

2.2.4 Discussion

With the proposed methodology, in addition to training four classifiers to predict the four performance specifications of the circuit, four additional constraints are added to predict the variations in the performance parameters across different corner cases of interest. The adoption of classifier chains allows for the modeling of the interdependencies among output labels. Based on the results of the performance of the models shown in FIGS. 2.6 and 2.7, some classifier chains boost the F1 score as compared to the baseline of standalone classifiers. In addition, the ensemble of 10 random classifier chains also outperforms the eight standalone models for both performance prediction and robustness prediction.

Two implementations of classifier chains are presented. The first approach is to enumerate all of the possible orders of the chain and adopt the optimal order of classifiers. Execution of the first approach is feasible when the number of output labels is small (i.e., four). When the number of output labels is large, the number of possible order combinations of a classifier chain increases exponentially, which indicates that the second approach of applying an ensemble of randomly selected chains is a better option. The number of individual classifiers required when either the binary relevance or classifier chain technique is applied scales linearly with the size of the label set Therefore, there is no overhead in computational resources required to train classifier chains. However, during the optimization phase, each seed requires m times more functional evaluations when the ensemble is used as compared to applying only the best chain, where m is the number of classifier chains in the ensemble.

Among the generated candidate solutions, the plot of the standard deviation of the power consumption variation as a function of the power consumption is shown in FIG. 2.8 when all remaining performance and robustness requirements are satisfied. From the results shown in FIG. 2.8, the variation in the power consumption across all corners is positively correlated with the amount of power consumed. The results indicate that the performance metric and the robustness metric (standard deviations that characterize the variation) are correlated. Therefore, the modeling of the interdependencies amongst output labels is necessary and provides additional design information as compared to only modeling the mapping from the input to the output space.

Corner analysis is based on the assumption of a fixed value in the variation of a physical parameter pi. The relation between the variation in a physical parameter and the variation in a circuit performance parameter y is given by:

$$\Delta y = \sum_i \frac{\partial y}{\partial pi} \Delta p_i \qquad \text{EQ. 2.5}$$

The sensitivity term, ∂y/∂pi, varies for each performance metric as the sizes of the components and the bias voltages differ. Therefore, in the ideal case, corner models must be generated for each performance metric separately. Applying fixed variations for pi regardless of the sensitivities results in inaccuracies in the model. However, the proposed design methodology still applies as the simulation data is considered as ground truth.

An additional alternative to account for the effects of variations on the performance of the circuit is to train classifiers that consider the worst cases of the dataset. The limitation of the approach is that the worst-case performance often occurs in different corner cases for different target circuit specifications. As an example, the worst-case power consumption occurs when the FF corner is considered at 120° C. However, the worst-case gain occurs when the SS corner is considered at 20° C. Designing for the worst cases, therefore, results in ambiguous outcomes. Comparatively, designing based on the TT corner while constraining all the performance variations across all corners within a certain standard deviation, as proposed in this paper, provides viable solutions.

EMBODIMENTS

1. A method for generating optimal sizing solutions for devices of an analog circuit that satisfy the design specifications on circuit performance parameters and robustness parameters, wherein at each iteration of determining the optimal sizing solution, prediction models are trained and optimization is executed on the prediction models, and the iteration stops when a qualified solution is found or a preset maximum number of iterations is reached, wherein an ensemble of classifier chain models is trained to predict each target circuit performance parameter based on device sizes by training on circuit data.

2. The method of embodiment 1, wherein a multi-objective genetic algorithm is executed on m ensembles of the classifier chain to simultaneously maximize a probability that each of m performance specifications are satisfied.

3. The method of embodiment 2, wherein the performance specifications of an analog circuit are generated with a SPICE solver that randomly generates combinations of transistor sizes; then binary labels are assigned with a classification with an algorithm that adaptively sets labeling thresholds.

4. The method of embodiment 3, wherein classification is performed while using the algorithm, wherein a threshold is specified on a E percentile of data values of a performance parameter to resolve lass imbalance in a sampled dataset; wherein if the ε percentile value exceeds a specification value of the performance parameter, the threshold is set to the specification value; w 5. The method of embodiment 4, wherein binary labels are assigned as reference to the threshold.

6. The method of embodiment 2, wherein one ensemble model is comprised of a number of decision-tree classifiers and a final prediction of the ensemble is calculated as an average of the predictions of all the classifiers.

7. The method of embodiment 1, wherein to account for effects of circuit variations on circuit performance, standard deviations are calculated on evaluations of a performance parameter at all process, voltage, and temperature corners considered in an application of a set of transistor sizes.

8. A method for sizing analog circuit components using a simulation-based optimization framework using classifier chains that represent relationships among output parameters to improve framework accuracy, wherein when considering effects of design variations on circuit performance, simulations for each design point are acquired at each corner of interest and the standard deviations of the performance variations across all of the corners for each design point are then calculated, wherein design points with performance fluctuations that fall below a set threshold $T_{thre}$ of the standard deviation are assigned with positive labels, while all other points are assigned negative labels.

2.5 Conclusions

In this section, a simulation-based optimization framework is proposed that determines the sizing of components of an analog circuit to meet target design specifications while also satisfying the robustness specifications set by the designer. The robustness is guaranteed by setting a limit on the standard deviations of the variations in the performance parameters of a circuit across all process and temperature corners of interest. Classifier chains are used that, in addition to modeling the relationship between inputs and outputs, learn the relationships amongst output labels. The proposed methodology is applied to the design of an LNA in a 65 nm fabrication process. The use of classifier chains and the ensemble of classifier chains provides an improvement in the prediction accuracy as compared to the binary relevance method. A qualified design solution is generated that satisfies both the performance and robustness specifications across all of the corners considered. The gain, noise figure, IP3, and power consumption of the design of the LNA are 10.76 dB, 2.78 dB, −2.65 dBm, and 16.8 mW, while the standard deviations across all considered corners are 0.74 dB, 0.45 dB, 0.47 dBm, and 4.9 mW, respectively.

While the invention has been described with reference to the embodiments above, a person of ordinary skill in the art would understand that various changes or modifications may be made thereto without departing from the scope of the claims.

We claim:

1. A method for generating optimal sizing solutions for devices of an analog circuit that satisfy the design specifications on circuit performance parameters and robustness parameters, the method comprising performing one or more iterations, each iteration comprising:

training prediction models on circuit data, wherein the prediction models comprise an ensemble of classifier chain models trained to predict each target circuit performance parameter based on device sizes, the ensemble comprising a plurality of classifier chains, each classifier chain comprising a plurality of binary classifiers arranged in a sequence in which a downstream classifier in the sequence receives, as one or more additional input features, predictions output by one or more upstream classifiers in the sequence; and executing a multi-objective genetic algorithm on the trained prediction models to simultaneously maximize a probability that each of m performance specifications is satisfied, wherein the iterations stop when a qualified sizing solution that satisfied the design specifications is found or a preset maximum number of iterations is reached.

2. The method of claim 1, wherein the ensemble comprises m classifier chains, each classifier chain trained on a random ordering of binary classifiers, and predictions from the m classifier chains are summed and averaged for each label, and a threshold is applied to the averaged predictions to determine final predicted labels.

3. The method of claim 2, wherein the circuit data is generated by executing a SPICE solver on randomly generated combinations of transistor sizes; and binary labels are assigned with an adaptive labeling threshold algorithm that adaptively sets labeling thresholds.

4. The method of claim 3, wherein the adaptive labeling threshold algorithm sets, for a circuit performance parameter, a labeling threshold equal to an ε percentile of data values of the performance parameter to resolve class imbalance in a sampled dataset; wherein if the ε percentile value exceeds a specification value of the circuit performance parameter, the labeling threshold is set to the specification value.

5. The method of claim 4, wherein the binary labels are assigned with reference to the labeling threshold.

6. The method of claim 5, wherein a binary label of 1 is assigned to qualified data points and a binary label of 0 is assigned to unqualified data points.

7. The method of claim 1, wherein each binary classifier in each classifier chain is a decision-tree classifier, and a final prediction of the ensemble for a given target circuit performance parameter is calculated as an average of the predictions output by the plurality of classifier chains.

8. The method of claim 1, further comprising, for each of a plurality of sets of transistor sizes and for each circuit performance parameter, calculating a standard deviation of evaluations of the circuit performance parameter across a plurality of process, voltage, and temperature corners, and using the calculated standard deviations as inputs to the prediction models to account for effects of circuit variations on circuit performance.

9. A computer-implemented method for sizing analog circuit components using a simulation-based optimization framework that employs classifier chains representing relationships among output parameters, the method comprising:

for each of a plurality of design points, acquiring, by one or more processors, simulations of the analog circuit at each of a plurality of corners of interest;

for each of the plurality of design points, calculating, by the one or more processors, a standard deviation of performance variations of a circuit performance parameter across the plurality of corners of interest;

assigning a positive label to each design point for which the calculated standard deviation falls below a set threshold Tthre, and assigning a negative label to all other design points; and training the classifier chains using the labeled design points to predict whether a given design point satisfies a robustness specification.

10. A system for generating optimal sizing solutions for devices of an analog circuit that satisfy design specifications on circuit performance parameters and robustness parameters, the system comprising:

one or more processors; and non-transitory computer-readable memory storing instructions that, when executed by the one or more processors, cause the system to perform operations comprising, in each of one or more iterations:

training prediction models on circuit data, wherein the prediction models comprise an ensemble of classifier chain models trained to predict each target circuit performance parameter based on device sizes, the ensemble comprising a plurality of classifier chains, each classifier chain comprising a plurality of binary classifiers arranged in a sequence in which a downstream classifier in the sequence receives, as one or more additional input features, predictions output by one or more upstream classifiers in the sequence; and executing a multi-objective genetic algorithm on the trained prediction models to simultaneously maximize a probability that each of m performance specifications is satisfied, wherein the operations terminate when a qualified sizing solution that satisfies the design specifications is found or a preset maximum number of iterations is reached.

11. The system of claim 10, wherein the ensemble comprises m classifier chains, each classifier chain trained on a random ordering of binary classifiers, and predictions from the m classifier chains are summed and averaged for each label, and a threshold is applied to the averaged predictions to determine final predicted labels.

12. The system of claim 10, wherein the operations further comprise generating the circuit data by executing a SPICE solver on randomly generated combinations of transistor sizes, and assigning binary labels to each circuit performance parameter using an adaptive labeling threshold algorithm that adaptively sets labeling thresholds.

13. The system of claim 12, wherein the adaptive labeling threshold algorithm sets, for a circuit performance parameter, a labeling threshold equal to an ε percentile of data values of the circuit performance parameter to resolve class imbalance in a sampled dataset, and wherein if the ε percentile value exceeds a specification value of the circuit performance parameter, the labeling threshold is set to the specification value.

14. The system of claim 13, wherein the binary labels are assigned with reference to the labeling threshold, with a binary label of 1 assigned to qualified data points and a binary label of 0 assigned to unqualified data points.

15. The system of claim 10, wherein each binary classifier in each classifier chain is a decision-tree classifier, and a final prediction of the ensemble for a given target circuit performance parameter is calculated as an average of predictions output by the plurality of classifier chains.

16. The system of claim 10, wherein the operations further comprise, for each of a plurality of sets of transistor sizes and for each circuit performance parameter, calculating a standard deviation of evaluations of the circuit performance parameter across a plurality of process, voltage, and temperature corners, and providing the calculated standard deviations as inputs to the prediction models to constrain robustness.

17. The system of claim 16, wherein the plurality of process, voltage, and temperature corners comprises five process corners—typical-typical (TT), fast-fast (FF), slow-slow (SS), slow-fast (SF), and fast-slow (FS)—at each of a plurality of temperatures.

18. The system of claim 10, wherein the multi-objective genetic algorithm comprises a non-dominated sorting genetic algorithm (NSGA-II).

19. The system of claim 10, wherein the operations further comprise initializing the circuit data by Latin Hypercube Sampling of a design space, the design space comprising one or more transistor widths, one or more inductor sizes, one or more capacitor sizes, and one or more biasing voltages.

20. The system of claim 10, wherein the analog circuit comprises an inductively degenerated differential low-noise amplifier, and the target circuit performance parameters comprise gain, noise figure, third-order intercept point, and power consumption.

* * * * *